United States Patent
Ko et al.

(10) Patent No.: US 11,700,990 B2
(45) Date of Patent: Jul. 18, 2023

(54) ROBOT CLEANER

(71) Applicant: LG ELECTRONICS INC., Seoul (KR)

(72) Inventors: Moohyun Ko, Seoul (KR); Sungjun Kim, Seoul (KR); Donggeun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 16/944,355

(22) Filed: Jul. 31, 2020

(65) Prior Publication Data

US 2021/0030249 A1 Feb. 4, 2021

(30) Foreign Application Priority Data

Jul. 31, 2019 (KR) .................. 10-2019-0093491

(51) Int. Cl.
*A47L 11/40* (2006.01)
*B25J 11/00* (2006.01)
*A47L 11/283* (2006.01)

(52) U.S. Cl.
CPC ......... *A47L 11/4083* (2013.01); *A47L 11/283* (2013.01); *A47L 11/4025* (2013.01);
(Continued)

(58) Field of Classification Search
CPC ............. A47L 2201/00; A47L 2201/04; A47L 11/4083; A47L 11/283; A47L 11/4038; B25J 11/0085
See application file for complete search history.

(56) References Cited

U.S. PATENT DOCUMENTS

2006/0248676 A1 11/2006 Baek
2012/0199006 A1 8/2012 Swett
(Continued)

FOREIGN PATENT DOCUMENTS

CN 101543820 9/2009
CN 106901665 6/2017
(Continued)

OTHER PUBLICATIONS

Translated KR20100076134A (Year: 2022).*
(Continued)

*Primary Examiner* — Don M Anderson
*Assistant Examiner* — Sarah Akyaa Fordjour
(74) *Attorney, Agent, or Firm* — Ked & Associates, LLP

(57) ABSTRACT

A robot cleaner includes a main body forming an exterior and having a water tank housing formed at a rear side thereof. The water tank housing may form a space in which a water tank is mounted. At least one spin mop is rotatably provided at a lower side of the main body, moving the main body by rotating, and configured to clean a floor using water in the water tank. A supply nozzle is provided at one side of the water tank housing, and when connected to a discharge nozzle of the water tank, communicates with the discharge nozzle to supply water stored in the water tank to each of the spin mops. The robot cleaner further includes a locking device rotatably provided at a position spaced apart from a circumferential surface of the water tank housing, and configured to secure the water tank in the water tank housing when mounted or to release the water tank by pushing backward on the water tank.

16 Claims, 20 Drawing Sheets

(52) U.S. Cl.
CPC ....... *A47L 11/4038* (2013.01); *A47L 11/4075* (2013.01); *A47L 11/4088* (2013.01); *B25J 11/0085* (2013.01)

(56) References Cited

U.S. PATENT DOCUMENTS

| | | |
|---|---|---|
| 2014/0182627 A1 | 7/2014 | Williams et al. |
| 2019/0038101 A1 | 2/2019 | Jang et al. |
| 2019/0191952 A1 | 6/2019 | Johnson |
| 2019/0208970 A1* | 7/2019 | Suchman ............ A47L 11/4075 |
| 2019/0290089 A1* | 9/2019 | Johnson ................ A47L 11/305 |
| 2020/0323413 A1 | 10/2020 | Li |

FOREIGN PATENT DOCUMENTS

| | | |
|---|---|---|
| CN | 207734102 | 8/2018 |
| CN | 208081173 | 11/2018 |
| CN | 208510944 | 2/2019 |
| KR | 10-2006-0115220 | 11/2006 |
| KR | 10-2007-0018641 | 2/2007 |
| KR | 10-0704484 | 4/2007 |
| KR | 10-2008-0016070 | 2/2008 |
| KR | 100946299 B1 * | 3/2008 |
| KR | 10-0836680 | 6/2008 |
| KR | 10-2008-0100981 | 11/2008 |
| KR | 10-2009-0102296 | 9/2009 |
| KR | 100946299 B1 * | 9/2009 |
| KR | 10-2010-0076134 | 7/2010 |
| KR | 10-2013-0058495 | 6/2013 |
| KR | 10-1329605 | 11/2013 |
| KR | 10-2016-0121844 | 10/2016 |
| KR | 10-2017-0034362 | 3/2017 |
| KR | 10-2018-0008251 | 1/2018 |
| KR | 10-2018-0042923 | 4/2018 |
| KR | 10-2019-0015940 | 2/2019 |
| KR | 20100076134 A * | 7/2020 |
| RU | 2 344 030 | 1/2009 |

OTHER PUBLICATIONS

Translated KR100946299B1 (Year: 2022).*
Translation of KR100946299A1 (Year: 2023).*
International Search Report dated Nov. 13, 2020 issued in Application No. PCT/KR2020/010122.
Korean Office Action dated Sep. 28, 2020 issued in Application No. 10-2019-0093494.
Korean Office Action dated Sep. 22, 2020 issued in Application No. 10-2019-0093491.
Korean Office Action dated Sep. 23, 2020 issued in Application No. 10-2019-0093492.
Korean Notice of Allowance dated Sep. 28, 2021 issued in KR Application No. 10-2021-0079321.
U.S. Office Action issued in U.S. Appl. No. 16/944,375 dated Oct. 29, 2021.
IRobot. Owner's Guide, https://prod-help-content.care.irobotapi.com/files/i-series/i7/ownersGuide/og-i7-en-GB.pdf 2018 (Year: 2018).
You tube Video—https://youtube.com/watch ?v=W9_Mur3kdrY- iRobot (Year: 2020).
U.S. Office Action issued in U.S. Appl. No. 16/943,288 dated Apr. 27, 2022.
University of Virginia, Lecture 8 Magnetic Fields Chp. 29, Jul. 14, 2006, Slide 5, http://galileo.phys.virginia.edu/classes/632.ral5q.summer06/Lecture1-16_Powerpoints/lecture_8_mat/PYHS632_c8_Mag_Field.pdf (Year: 2006).
U.S. Appl. No. 16/944,375, filed Jul. 31, 2020.
U.S. Office Action dated Sep. 12, 2022 issued in U.S. Appl. No. 16/943,288.
U.S. Appl. No. 16/943,288, filed Jul. 30, 2020.
Russian Office Action dated Sep. 20, 2022 issued in RU Application No. 2022104529.
Chinese Office Action dated Sep. 22, 2022 issued in CN Application No. 202080059236.6.

* cited by examiner

ROBOT CLEANER

CROSS-REFERENCE TO RELATED APPLICATION(S)

This application claims priority under 35 U.S.C. § 119 to Korean Application No. 10-2019-0093491, filed in Korea on Jul. 31, 2019, whose entire disclosure(s) is/are hereby incorporated by reference.

BACKGROUND

1. Field

The present disclosure relates to a robot cleaner.

2. Background

Robot cleaners for cleaning the floor or other surfaces to be cleaned (hereinafter, "floors") have recently been developed. Robot cleaners travel across floors to remove foreign materials by suctioning or wiping the foreign materials from the floor surface.

A robot cleaner capable of mopping the floor may move on the surface by rotational friction while rotating about a rotary shaft, which is approximately perpendicular to the floor surface, and by mopping the surface with the rotational friction. A robot cleaner may mop the floor surface with a wet mop. Such a robot cleaner may have a water tank to supply water to spin mops rotating and mopping the floor.

While such a wet mopping robot cleaner may have a stable structure, robot cleaners having a detachable water tank may experience leaking from a connection portion.

Korean Laid-open Patent Publication No. KR10-2019-0015940 discloses a robot cleaner having a detachable water tank without a fixing and a pressing means provided separately for a connection portion, causing leaks.

BRIEF DESCRIPTION OF THE DRAWINGS

Embodiments will be described in detail with reference to the following drawings in which like reference numerals refer to like elements, and wherein.

DETAILED DESCRIPTION

In the description of a robot cleaner and a water tank, a direction in which the water tank is withdrawn may be defined as a rear direction, a direction opposite to the rear direction may be defined as a front direction, a direction in which a spin mop is provided may be defined as a lower direction, and a direction opposite to the lower direction may be defined as an upper direction. Further, a direction of both sides which is perpendicular to the front direction, the rear direction, the upper direction and the lower direction may be defined as a left-right direction. A configuration of the water tank will be described based on the above directions when the water tank is mounted in a water tank housing.

Figure 1A:
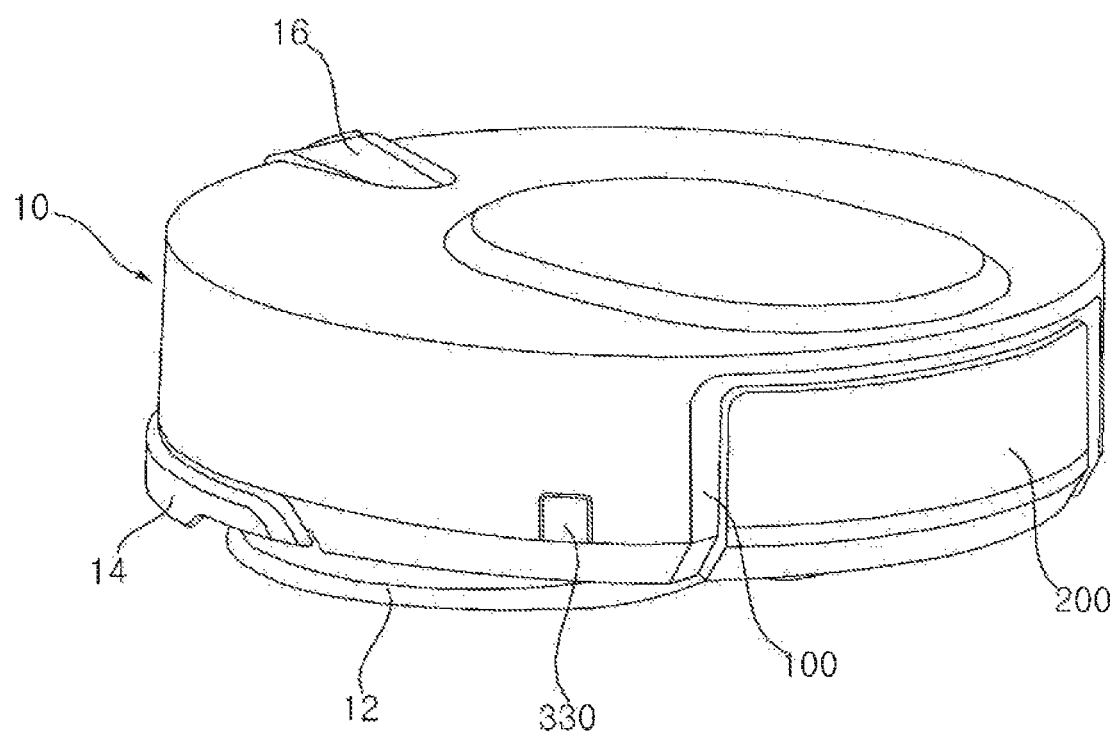
FIG. 1A is a rear perspective view of a robot cleaner according to an embodiment of the present disclosure.
Figure 1B:
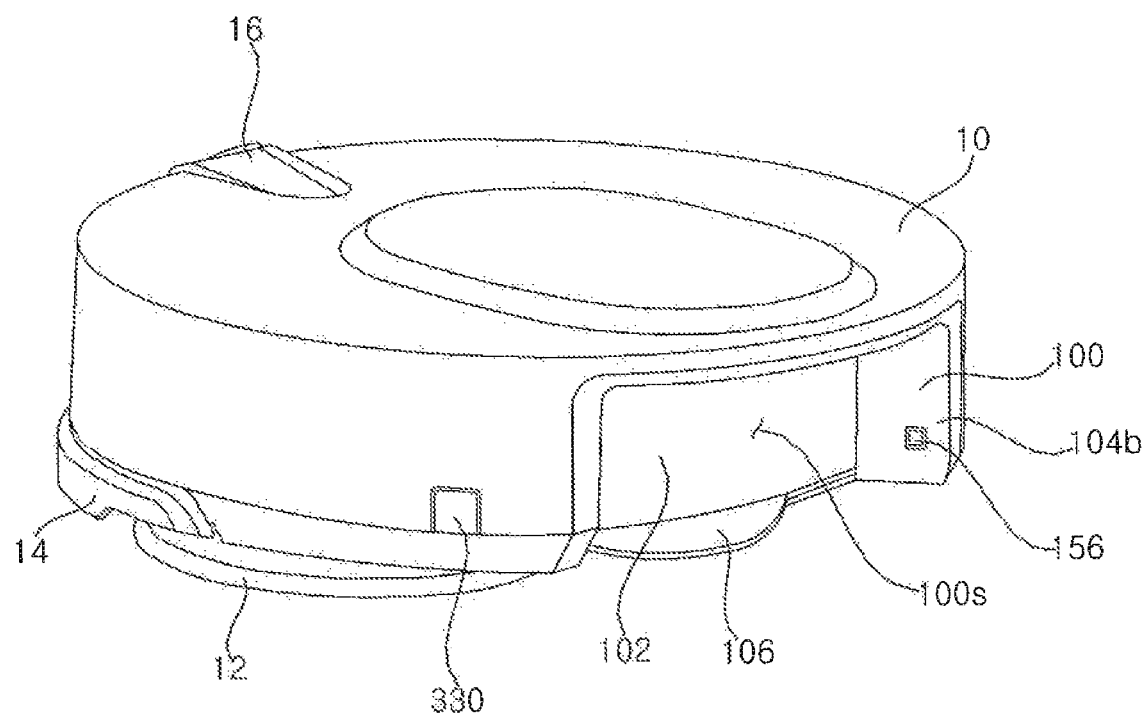
FIG. 1B is a rear perspective view of the robot cleaner of FIG. 1A, from which a water tank is excluded.
Figure 2:
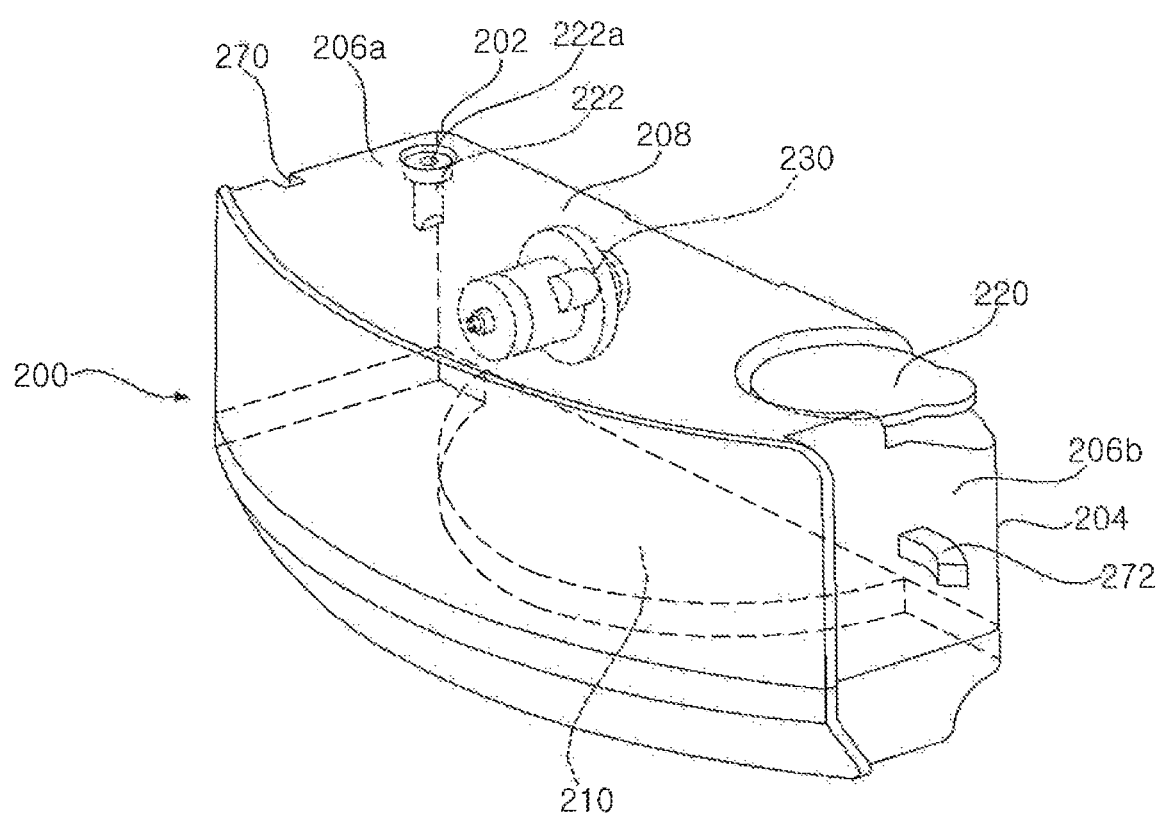
FIG. 2 is perspective view of a water tank according to an embodiment of the present disclosure.

Referring to FIGS. 1 and 2, an overall configuration of a robot cleaner 1 according to an embodiment of the present disclosure will be described below. The robot cleaner 1 may include a main body 10 forming an exterior of the robot cleaner 1 and having an internal space, at least one (e.g., two) spin mops 12 provided at a lower side of the main body 10, a water tank 200 mounted at the main body 10 to store water or liquid to be supplied to the pair of spin mops 12, and a water supply module or assembly provided inside of the main body 10 to supply the water stored in the water tank 200 to each of the pair of spin mops 12. The spin mops 12 may not only mop a surface to be cleaned (e.g., a floor surface), but also move the main body 10 while rotating, Although the drawings show a pair of spin mops 12, embodiments disclosed herein are not limited.

The robot cleaner 1 may further include a bumper 14 mounted at the front of the main body 10 to absorb any shock caused by coming in contact with obstacles on the floor surface. A sensor 16 may sense a position of the main body 10 and detect obstacles.

The main body 10 may have a flat disc shape. In the internal space of the main body 10, a printed circuit board (PBC) may be provided, which includes a controller to adjust a rotation speed of the pair of spin mops 12 or to adjust an amount of water to be supplied from the water tank 200 to the pair of spin mops 12 by controlling the water supply module. In the internal space of the main body 10, external power may be supplied to charge a battery, and charged power from the battery (or alternatively, directly from a commercial external power supply via a cable) may be provided to the printed circuit board or to a motor that rotates the pair of spin mops 12.

The water supply module may include a supply nozzle 110 connected to the water tank 200 mounted at the main body 10, a supply hose or channel to connect the supply nozzle 110 and each of the spin mops 12, and a pump provided at the supply hose to suction water stored in the water tank 200 to deliver the water to the spin mops 12.

Hereinafter, a water tank housing according to an embodiment of the present disclosure will be described with reference to FIG. 1B and FIGS. 5 to 7.

The main body 10 may include a water tank housing or dock 100 provided at the rear of the main body 10 and forming a mounting space 100s for the water tank 200. The water tank housing 100 may be integrally formed with the main body 10. Alternatively, the water tank housing 100 may be provided separately from the main body 10 and later combined. The mounting space 100s may have a shape or inner contour corresponding to an outer shape or contour of the water tank 200 so that the water tank 200 may be mounted and/or fitted in the mounting space 100s.

The water tank housing 100 may be a recessed portion of the main body 10 configured to receive the water tank 200. The water tank housing 100 may include a front or recessed surface 102, side surfaces 104a and 104b, an upper surface, and a lower surface 106. The front surface 102 may come into contact with or being provided closest to the water tank 200 when the water tank 200 is mounted in the water tank housing 100. The two side surfaces 104a and 104b may be formed to face side surfaces of the water tank 200 and may be configured to guide the water tank 200 when the water tank 200 is inserted into or withdrawn from the water tank housing 100. The upper surface may face an upper surface of the water tank 200 when the water tank 200 is mounted in the water tank housing 100. The lower surface 106 may support the water tank 200 when the water tank 200 is mounted in the water tank housing 100. The water tank housing 100 may have an open rear surface for the water tank 200 to be inserted into or withdrawn from the water tank housing 100. The front surface 102, the side surfaces 104a and 104b, the upper surface, and the lower surface 106 may form the mounting space 100s for the water tank 200 to be mounted therein.

When the water tank 200 is mounted in the water tank housing 100, the water tank 200 may contact the front surface 102, or alternatively be very close to the front surface 102. The water tank 200 may include a discharge nozzle 230 configured to connect to the supply nozzle 110 of the water tank housing 100 when the water tank 200 is mounted. The supply nozzle 110 may be provided at the front surface 102 of the water tank housing 100, and the discharge nozzle 230 may be positioned so as to align with the supply nozzle 110 upon mounting of the water tank 200. The discharge nozzle 230 and a connection to the supply nozzle 110 will be described later.

The supply nozzle 110 may include an insertion part or protrusion 112 forming an insertion space 112s for the discharge nozzle 230, a connection nozzle 120 having a hollow inner space and extending or protruding forward from a center of the insertion part 112, a pressing nozzle 122 having a hollow inner space and extending rearward from a center of the insertion part 112 toward the water tank 200 (FIG. 6), and an insertion part sealer or seal 130 provided at the insertion space 112s and pressed against the inserted discharge nozzle 230.

The insertion part 112 may protrude forward from the front surface 102. The insertion part 112 may have an inner circumferential surface 114 defining the insertion space 112s, which may have a cylindrical or annular shape inside the insertion part 112. An end surface 116 may be provided on an end portion of the circumferential surface 114.

The pressing nozzle 122 may be provided inside the insertion space 112s (e.g., at a middle or center position). The insertion part sealer 130 may be provided in the insertion space 112s between the pressing nozzle 122 and the inner circumferential surface and, when the discharge nozzle 230 is inserted, pressed against the discharge nozzle 230, thereby preventing water supplied from the discharge nozzle 230 from leaking to an outside of the robot cleaner 1.

Figure 3:
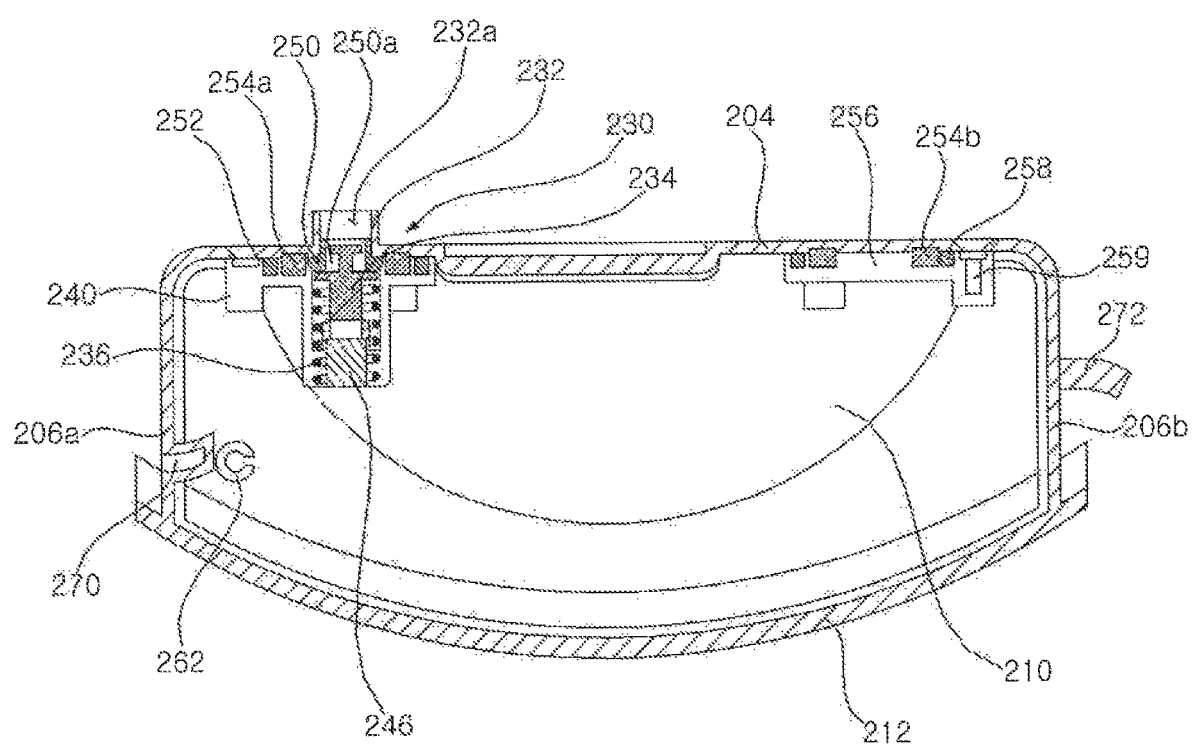
FIG. 3 is a cross-sectional view of a water tank, taken in a left-right direction according to an embodiment of the present disclosure.

The insertion part sealer 130 may be provided along or around an outer circumferential surface of the pressing nozzle 122. The insertion part sealer 130 may include an end or front contact surface 132 (FIG. 5) provided at the insertion part end surface 116 to come into contact with an end portion of an insertion nozzle 232 (see also FIGS. 3-4) of the discharge nozzle 230, a pressing nozzle contact surface 134 connected to the end contact surface 132 and extending along or around the outer circumferential surface of the pressing nozzle 122, and at least one contact protrusion or fin 136a and/or 136b protruding outward from the pressing nozzle contact surface 134 in the insertion space 112s.

The contact protrusions 136a and 136b protrude from the pressing nozzle contact surface 134 toward the insertion part end surface 116 in a hopper or slanted shape. The contact protrusions 136a and 136b may include a first contact protrusion 136a provided at the end portion of the pressing nozzle contact surface 134 and a second contact protrusion 136b interposed between the first contact protrusion 136a and the end contact surface 132.

The connection nozzle 120 may protrude forward from the insertion part end surface 116 and may be connected to a supply hose provided inside the main body 10. The pressing nozzle 122 may protrude rearward from the insertion part end surface 116 and press against one side of a discharge port valve 234 when the water tank 200 is mounted in the water tank housing 100. The pressing nozzle 122 and the connection nozzle 120 are provided in a front-rear direction and have hollow inner portions or spaces which communicate with each other.

The pressing nozzle 122 protrudes rearward of the front surface 102 of the water tank housing 200. A spacing protrusion 124 may be provided at an end portion of the pressing nozzle 122 to protrude rearward at a rear outer end or tip of the pressing nozzle 122. A plurality of spacing protrusions 124 may be spaced apart along the rear end pressing nozzle 122. Accordingly, even when the pressing nozzle 122 is contact with the discharge port valve 234, the pressing nozzle 122 may not be blocked and be maintained to be spaced apart from the discharge port valve 234.

Body-side fixing members 140a and 140b may be provided to fix an arrangement of the water tank 200 when mounted in the water tank housing 100. A first body-side fixing member 140a may be formed in a ring shape at a first (e.g., left) side of the front surface 102 to be provided around an outer circumference of the insertion part 112, while a second body-side fixing member 140b may be provided at a second (e.g., right) side of the front surface 102 in a ring shape. The second body-side fixing member 140b may be provided at a position corresponding to a second water tank-side fixing member described later. The body-side fixing members 140a and 140b may be magnetics (e.g., a permanent magnet) to generate or exert a magnetic force. A rare earth magnet having a strong magnetic force may be used as the body-side fixing members 140a and 140b. More details of the supply nozzle 110 and the discharge nozzle 230 will be described later.

Figure 7:
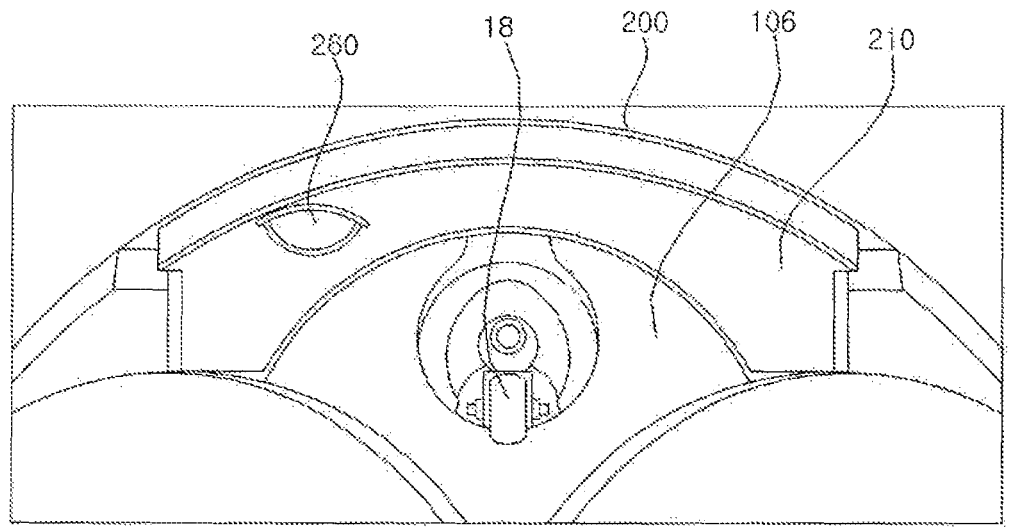
FIG. 7 is a bottom view of a water tank mounted in a water tank housing according to an embodiment of the present disclosure.

Referring to FIG. 7, an auxiliary wheel 18 may support a rear portion of the main body 10. The auxiliary wheel 18 may be provided below the lower surface 106 of the water tank housing 100.

Hereinafter, the water tank 200 according to an embodiment of the present disclosure will be described with reference to FIGS. 2 to 7.

The water tank 200 may include a water tank case 202 forming a space to store water, an opening cover or lid to open or close an opening formed at an upper side of the water tank case 202, the discharge nozzle 230 configured to connect to the supply nozzle 110, and water tank-side fixing members 254a and 254b to maintain a mounting of the water tank 200 in the water tank housing 100. A first water tank-side fixing member 254a may correspond to and align with the first body-side fixing member 140a, and a second water tank-side fixing member 254b may correspond to and align with the second body-side fixing member 140b.

The water tank case 202 may have a shape corresponding to the mounting space 100s formed by the water tank housing 100. Accordingly, the water tank case 202 may be inserted into or withdrawn from the mounting space 100s formed by the water tank housing 100.

The water tank case 202 may include a front surface 204 configured to face the front surface 102 of the water tank 100, side surfaces 206 configured to face the side surfaces 104a and 104b of the water tank housing 100, an upper surface 208 configured to face the upper surface of the water tank housing 100, a lower surface 210 configured to face the lower surface 106 of the water tank housing 100, and a rear surface 212 provided at the rear side and exposed to an outside. For convenience of description, the front surface 204, side surfaces 206, upper surface 208, lower surface 210, and rear surface 212 of the water tank case 202 may be referred to a case front surface, case side surfaces, case upper surface, case lower surface, and case rear surface, respectively. The front surface 102, side surfaces 104a and 104b, upper surface, and lower surface 106 of the water tank 100 may be referred to as a housing front surface, housing side surfaces, housing upper surface, and housing lower surface, respectively.

An opening may be formed at the upper side of the water tank case 202 to supply water into the inside of the water tank case 202. An opening cover or cap 220 may open or close the opening. The opening cover 220 may alternatively be referred to as a lid. The opening cover 220 may be provided at the case upper surface 208 where the opening is formed.

An air passage 222a for communicating the inside and outside of the water tank 200 is formed at the upper side of the water tank case 202. The air passage 222a may be formed at a separate passage member 222 mounted at the upper side of the water tank case 202. The passage member 222 having the air passage 222a may be provided at the case upper surface 208.

The air passage 222a may be formed at the case upper surface 208. The case upper surface 208 may be spaced apart from the housing upper surface by a predetermined distance when the water tank 200 is mounted in the water tank housing 100. Accordingly, even when water in the water tank 200 is discharged through the discharge nozzle 230 while the water tank 200 is mounted, external air may be drawn into the water tank 200 through the air passage 222a.

The discharge nozzle 230 may be provided at the case front surface 204. The discharge nozzle 230 may be biased to the left side or to the right side on the case front surface 204. The discharge nozzle 230 according to an embodiment of the present disclosure is biased to the left side of the case front surface 204. A connection hose fixing member 262, which will be described below, may be biased to the same size of the discharge nozzle 230 (i.e., the left side) on the case lower surface 210 such that a length of the connection hose extending between the discharge nozzle 230 and the connection hose fixing member 262 may be minimized.

The discharge nozzle 230 may include the insertion nozzle 232 inserted into the insertion space 112s, a discharge port 232a, which is open to the front side, provided at a front of the insertion nozzle 232, a discharge port valve 234 provided behind the insertion nozzle 232 to open or close the discharge port 232a by moving forwards and backwards, an elastic member or spring 236 applying an elastic force to the discharge port valve 234 in one direction (e.g., a forward direction), and a nozzle housing 240 mounted into the water tank case 202 and forming a space to mount the discharge port valve 234.

The insertion nozzle 232 may have a cylindrical shape and protrude forward from the case front surface 204. The insertion nozzle 232 may be inserted into the insertion space 112s when the water tank 200 is mounted to be provided between the pressing nozzle 122 and the insertion part circumferential surface 114 and be pressed against the insertion part sealer 130.

The discharge port valve 234 may be provided in an inner space formed by the nozzle housing 240 to move forwards and backwards. The discharge port valve 234 may include a first surface 234a pressed against the pressing nozzle 122 when the water tank 200 is mounted, a second surface 234b spaced apart rearward from the first surface 234a and coming into contact with an internal sealer 250 to restrict forward movement of the discharge port valve 234, and at least one guide protrusion 234c protruding rearward from the second surface 234b and moving along a valve moving guider or guide 246 formed at the nozzle housing 240.

A diameter 234aD of the first surface 234a may be smaller than a diameter 234bD of the second surface 234b. The first surface 234a may be spaced apart forward from the second surface 234b. The diameter 234aD of the first surface 234a may be smaller than a diameter 250D of an inner circumferential surface of the internal sealer 250. The diameter 234bD of the second surface 234b is greater than the diameter 250D of the inner circumferential surface of the internal sealer 250. The second surface 234b may come into contact with the elastic member 236. Accordingly, when a force is not applied separately to the discharge port valve 234 to compress the elastic member 236, the discharge port valve 234 may move forward by a restoring force of the elastic member 236. When a force is not applied separately to the discharge port valve 234, the discharge port valve 234 comes into contact with the internal sealer 250 by the elastic force of the elastic member 236.

Figure 4:
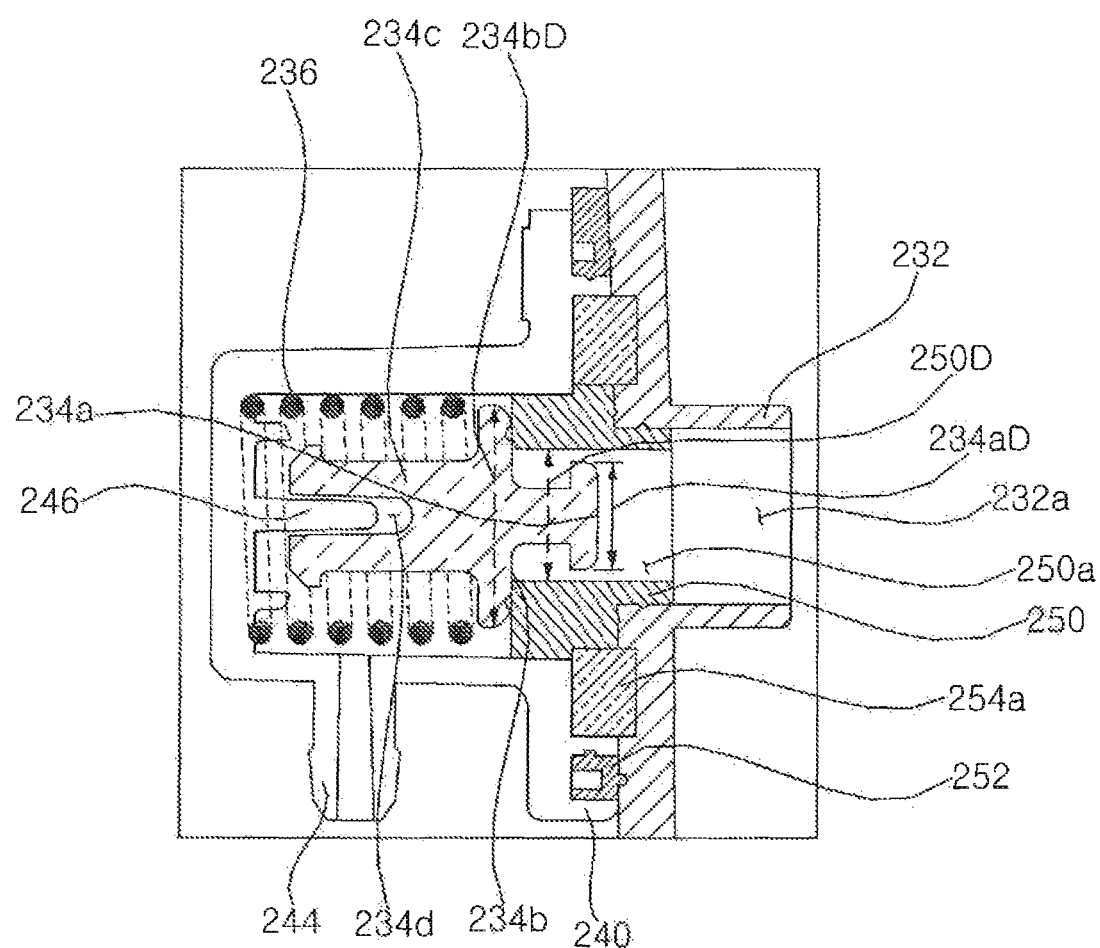
FIG. 4 is a cross-sectional view of a discharge nozzle of a water tank, taken in an up-down direction according to an embodiment of the present disclosure.
Figure 5:
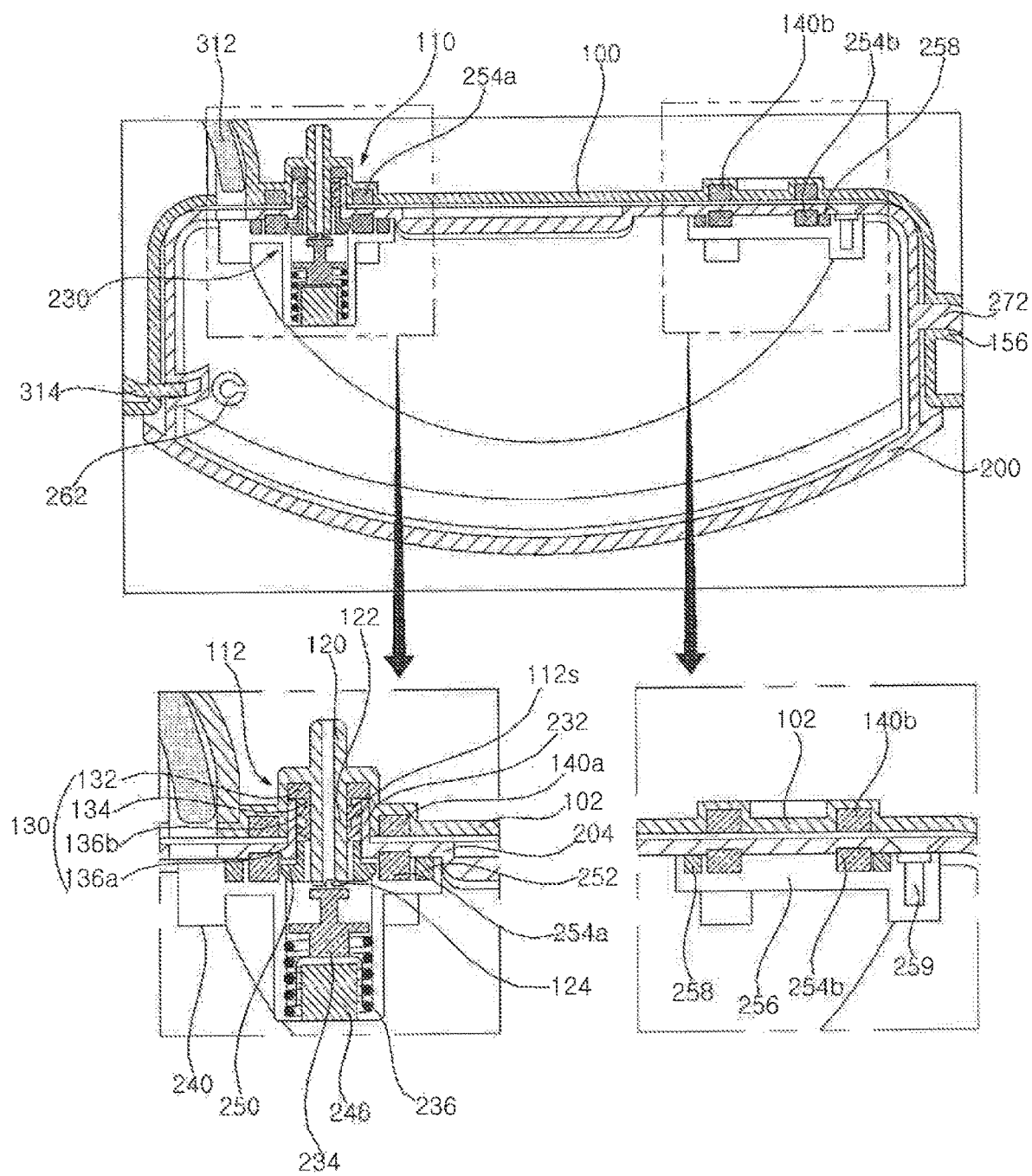
FIG. 5 is a cross-sectional view of a water tank mounted in a water tank housing, taken in a left-right direction according to an embodiment of the present disclosure.
Figure 6:
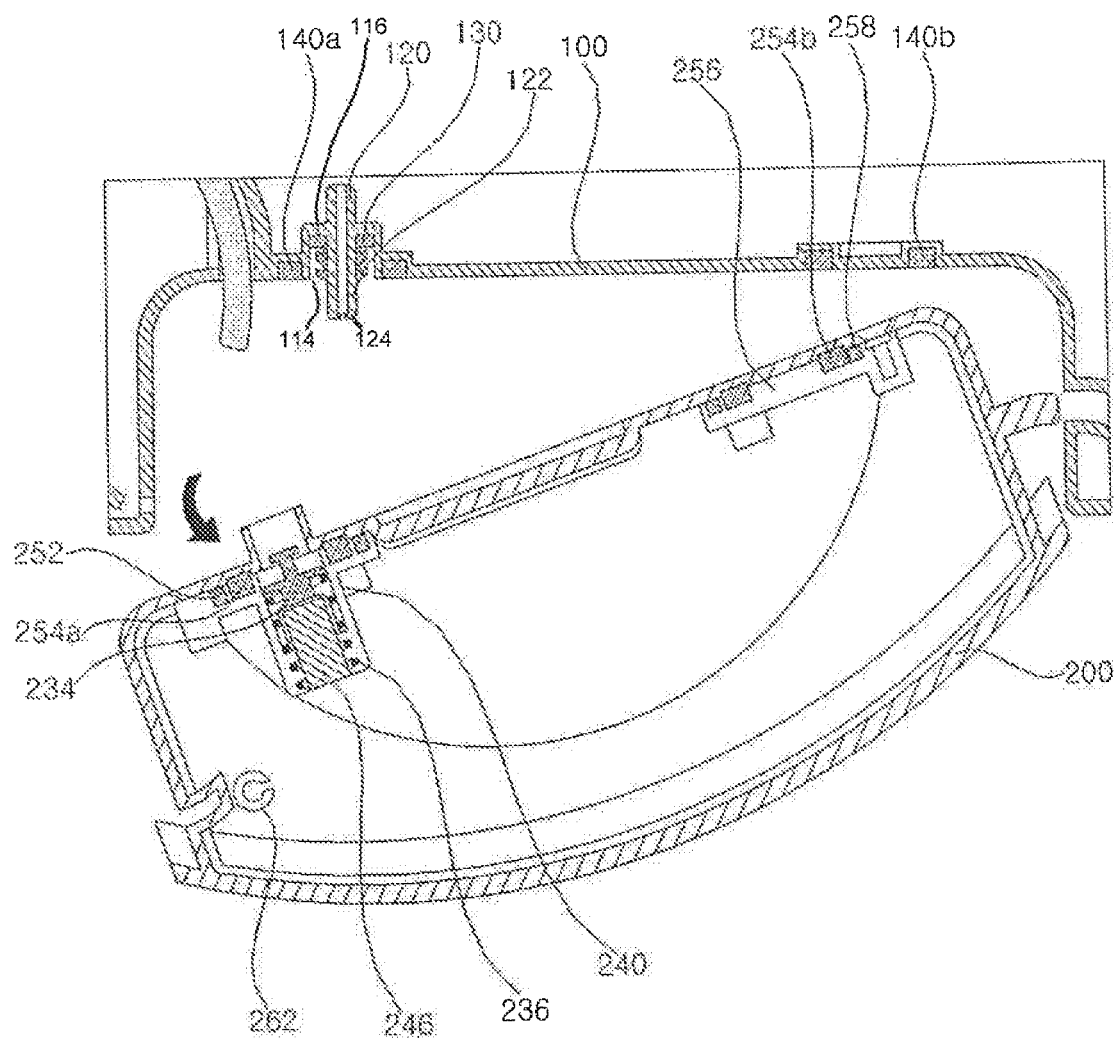
FIG. 6 is a cross-sectional view of a water tank which is moved backward from a mounting space of a water tank housing, taken in a left-right direction according to an embodiment of the present disclosure.

The guide protrusion 234c protrudes rearward from the second surface 234b. Referring to FIG. 4, the discharge port valve 234 includes a pair of guide protrusions 234c in an up-down direction. A guide groove 234d, in which the valve moving guider 246 is provided, may be formed between the pair of guide protrusions 234c.

The nozzle housing 240 may be mounted into the inside of the water tank case 202. The nozzle housing 240 may be fixed to the inside of the water tank case 202 via a separate coupling member 242.

Referring to FIG. 4, the nozzle housing 240 may have an internal nozzle 244 protruding to the inner space of the water tank 200. The internal nozzle 244 may protrude downward from the nozzle housing 240. A separate connection hose extending to the case lower surface 210 may be connected to the internal nozzle 244. The connection hose fixing member 262 for fixing the other end of the connection hose may be provided at the case lower surface 210.

The nozzle housing 240 may include the valve moving guider 246, protruding forward from a rear surface of the nozzle housing 240 and guiding the movement of the discharge port valve 234. The valve moving guider 246 may be provided into the guide groove 234d formed at the discharge port valve 234. As the valve moving guider 246 is inserted into the guide groove 234d, the discharge port valve 234 may move forward and backward.

A plurality of sealers 250, 252 are provided between the nozzle housing 240 and an inner surface of the water tank 200. The plurality of sealers 250, 252 may include an internal sealer 250 and an external sealer 252 provided between the nozzle housing 240 and the inner surface of the water tank 200. The internal sealer 250 may be provided at a portion where the discharge port 232a is formed, and the external sealer 252 may be provided on an outer circumferential surface of the nozzle housing 240.

The internal sealer 250 may be provided at the water tank case 202 having the discharge port 232a and restrict the movement of the discharge port valve 234 moving forward and backward. When the water tank 200 is not mounted in the water tank housing 100, the discharge port valve 234 is pressed against the internal sealer 250. The internal sealer 250 may have a ring shape. The internal sealer 250 may have a sealer opening 250a formed at the center thereof and communicating with the discharge port 232a.

The external sealer 252 may have a greater radius than the internal sealer 250 and spaced apart from the internal sealer 250 in a radial direction. The external sealer 252 may have an annular shape. The water tank-side fixing members 254a and 254b may be interposed between the internal sealer 250 and the external sealer 252. Accordingly, the internal sealer 250 and the external sealer 252 may prevent water from flowing into the water tank-side fixing members 254a and 254b provided between the internal and external sealers 250 and 252.

The water tank-side fixing members 254a and 254b may generate a magnetic force (or alternatively be made of a magnetic material) to correspond to the body-side fixing members 140a and 140b. The water tank-side fixing members 254a and 254b may be provided between the nozzle housing 240 and the inner surface of the water tank 200 and between the external sealer 252 and the internal sealer 250.

The water tank-side fixing members 254a and 254b may be provided at the case front surface 204. When the water tank 200 is mounted in the water tank housing 100, the water tank-side fixing members 254a and 254b may be provided adjacent to the body-side fixing members 140a and 140b.

As the water tank-side fixing members 254a and 254b, a permanent magnet generating a magnetic force may be used. Further, a rare earth magnet having a strong magnetic force may also be used as the water tank-side fixing members 254a and 254b.

The water tank-side fixing members 254a and 254b may include the first water tank-side fixing member 254a provided at the discharge nozzle 230. The first water tank-side fixing member 254a and the second water tank-side fixing member 254b may be spaced apart from each other in a left-right direction with respect to the center of the water tank 200, and the second water tank-side fixing member 254b may be positioned so as to be bilaterally symmetrical to the first water tank-side fixing member 254a.

A second fixing member housing 256 may be provided to fix the second water tank-side fixing member 254b to the inside of the water tank 20. A fixing member sealer 258 may prevent water from flowing into the inside of the second fixing member housing 256 and/or between the water tank 200 and the water tank housing 100 is provided between the second fixing member housing 256 and the water tank 200.

The second water tank-side fixing member 254b may have the same ring shape as the first water tank-side fixing member 254a. The fixing member sealer 258 may have a ring shape to surround a circumferential surface of the second water tank-side fixing member 254b. The second fixing member housing 256 may be coupled to the inside of the water tank 200 via a separate coupling member 259.

The water tank 200 may have a shape which allows a user to easily hold the water tank 200 when withdrawing the water tank 200 from the water tank housing 100. A handle 260 (FIG. 7) may be provided at one side of the water tank case 202 at the case lower surface 210 so that the user's hand may hold the handle 260.

First Embodiment

Hereinafter, a structure of the water tank 200, the water tank housing 100, in which the water tank 200 is mounted, and a locking device or lock 300 to couple the water tank 200 and the water tank housing 100 according to the first embodiment will be described with reference to FIGS. 8 to 12.

The locking device 300 may be provided in the water tank housing 100 at a rear side (e.g., a left rear side). The locking device 300 may fix the arrangement of the water tank 200 when the water tank 200 is mounted, and when the water tank 200 is detached, the locking device 300 may push a portion of the water tank 200 to the rear side.

Figure 8:
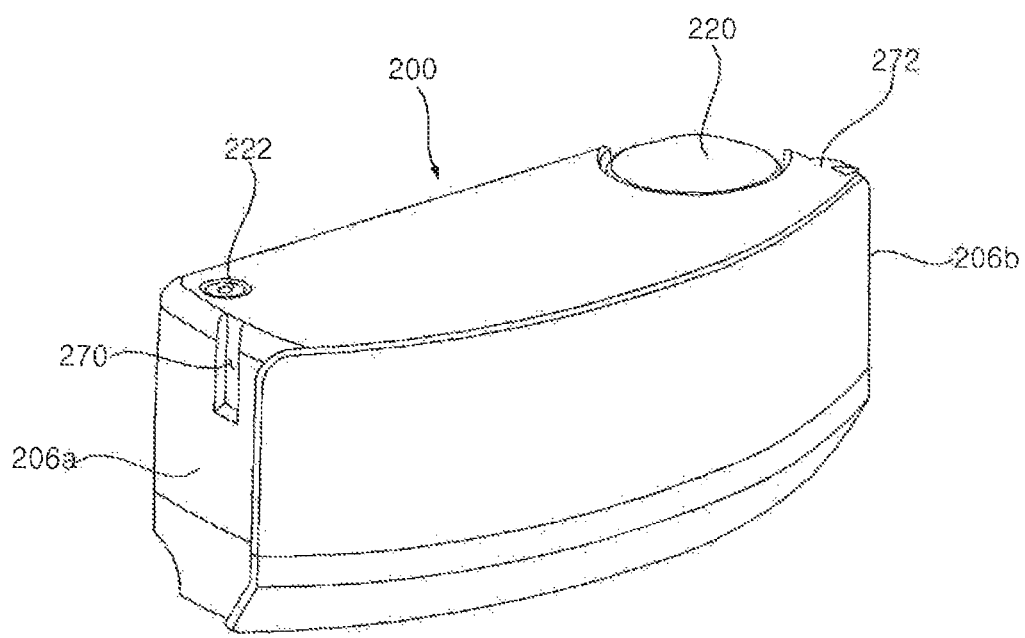
FIG. 8 is a rear perspective view of a water tank according to an embodiment of the present disclosure.
Figure 9:
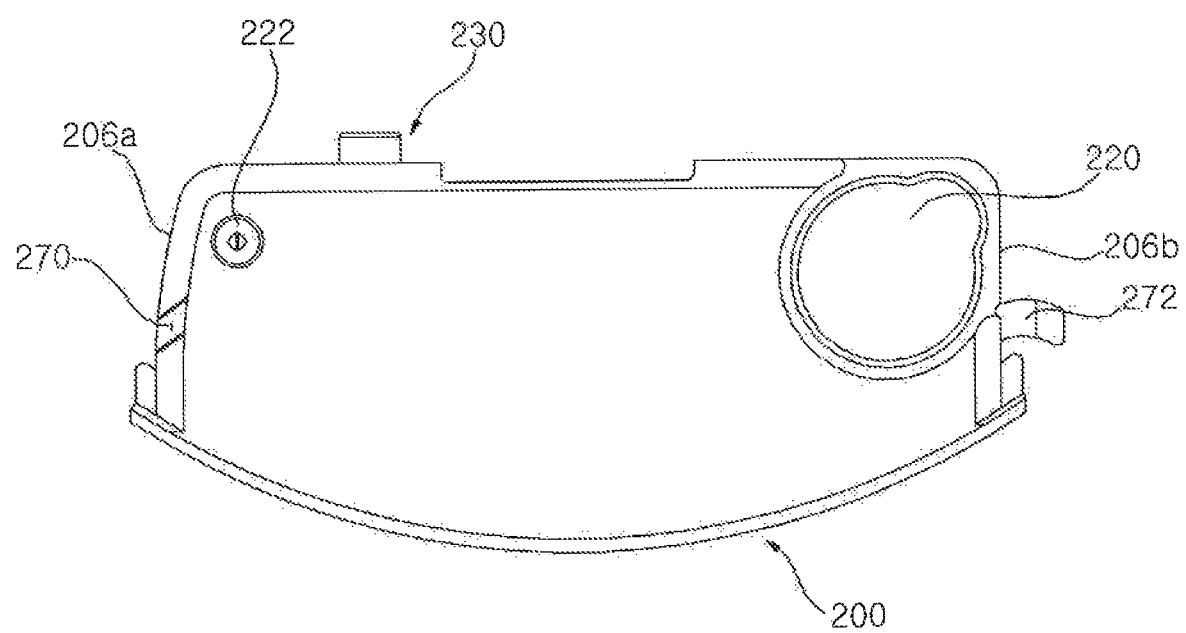
FIG. 9 is a plan view of a water tank according to an embodiment of the present disclosure.

Referring to FIGS. 8 and 9, the water tank 200 may have a lever groove 270 into which a lever 310 (FIG. 10) to be described later is inserted. The case side surfaces 206 may include a first or left case side surface 206a and a second or right case side surface 206b. The lever groove 270 may be provided at the first case side surface 206a. The water tank 200 may have a hinge protrusion 272 protruding from the second case side surface 206b. The hinge protrusion 272 may protrude forward from the second case side surface 206b in a convex curved shape.

The water tank housing 100 may have a locking lever hole 154 (FIG. 10) through which a locking lever 314 described later passes. The housing side surfaces 104a and 104b may include a first or left side surface 104a and a second or right side surface 104b (FIGS. 1B and 12), The locking lever hole 154 may be formed on the first housing side surface 104a at a position corresponding to the lever groove 270 of the water tank 200When the water tank 200 is mounted in the water tank housing 100, the locking lever 314 passes through the locking lever hole 154 to be inserted into the lever groove 270 of the water tank 200.

Figure 10:
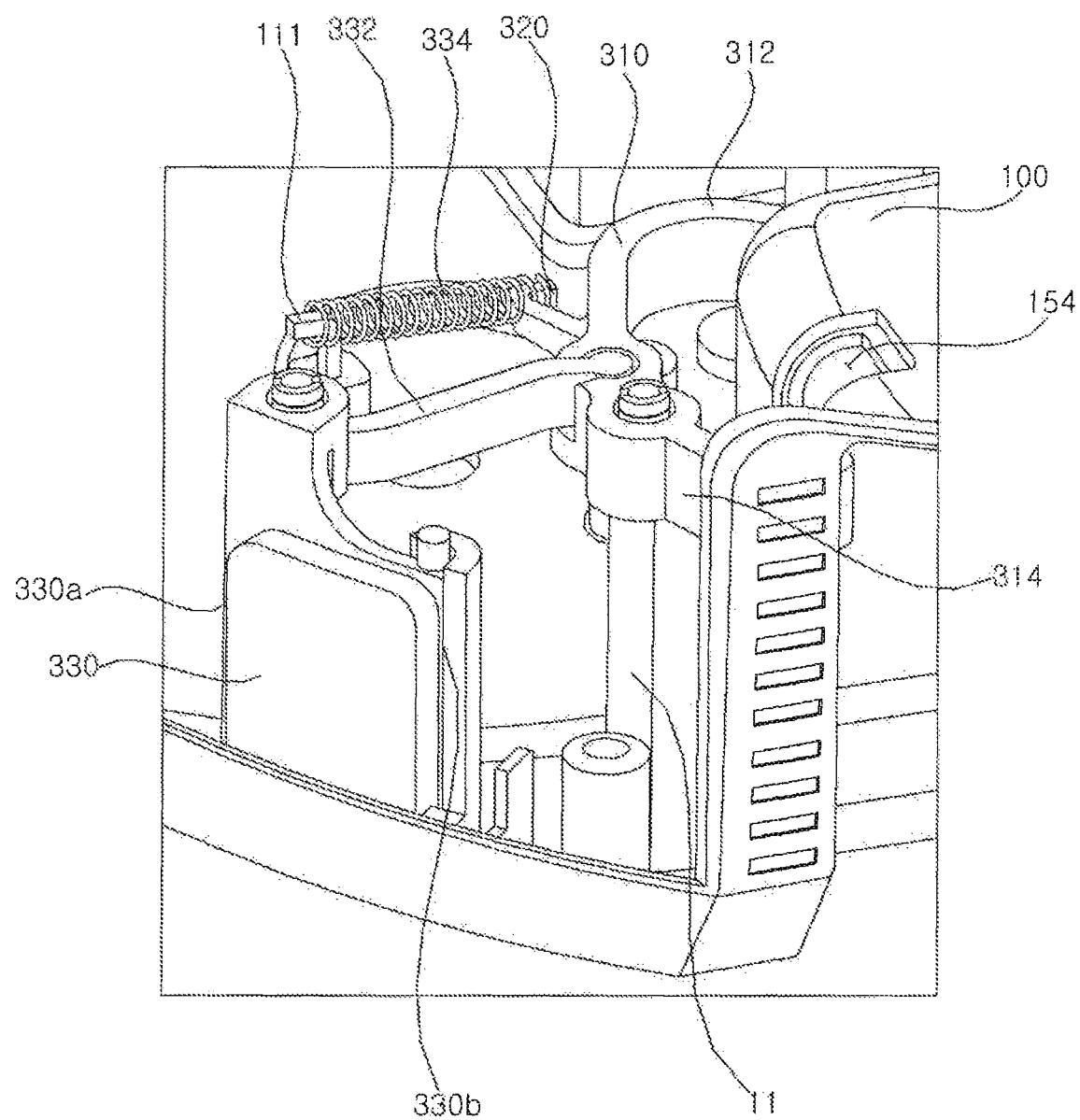
FIG. 10 is a diagram explaining a locking device provided inside a main body of a robot cleaner according to an embodiment of the present disclosure.
Figure 11A:
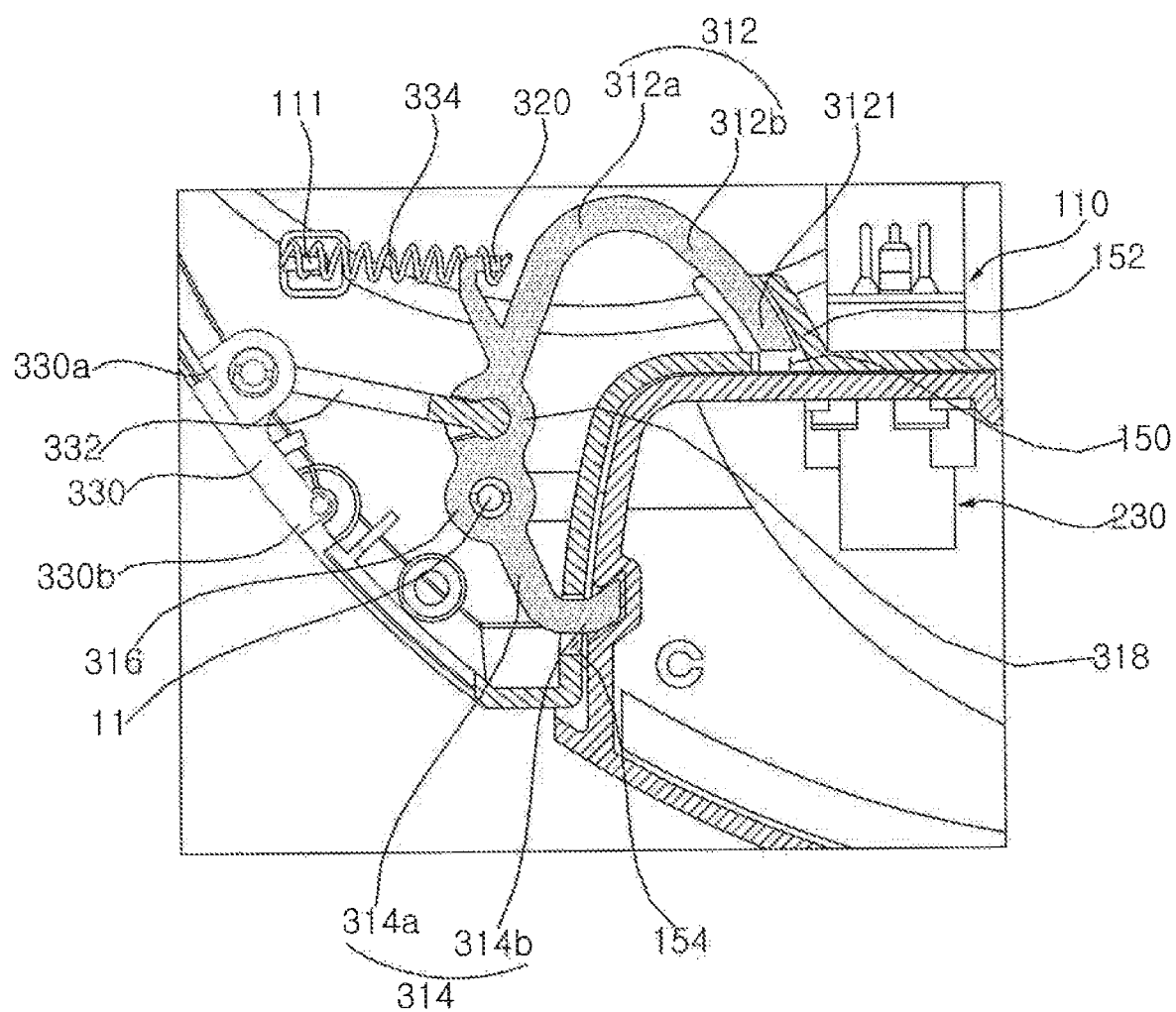
FIG. 11A is a diagram explaining a state in which a water tank is mounted in a water tank housing by a locking device, according to an embodiment of the present disclosure.
Figure 11B:
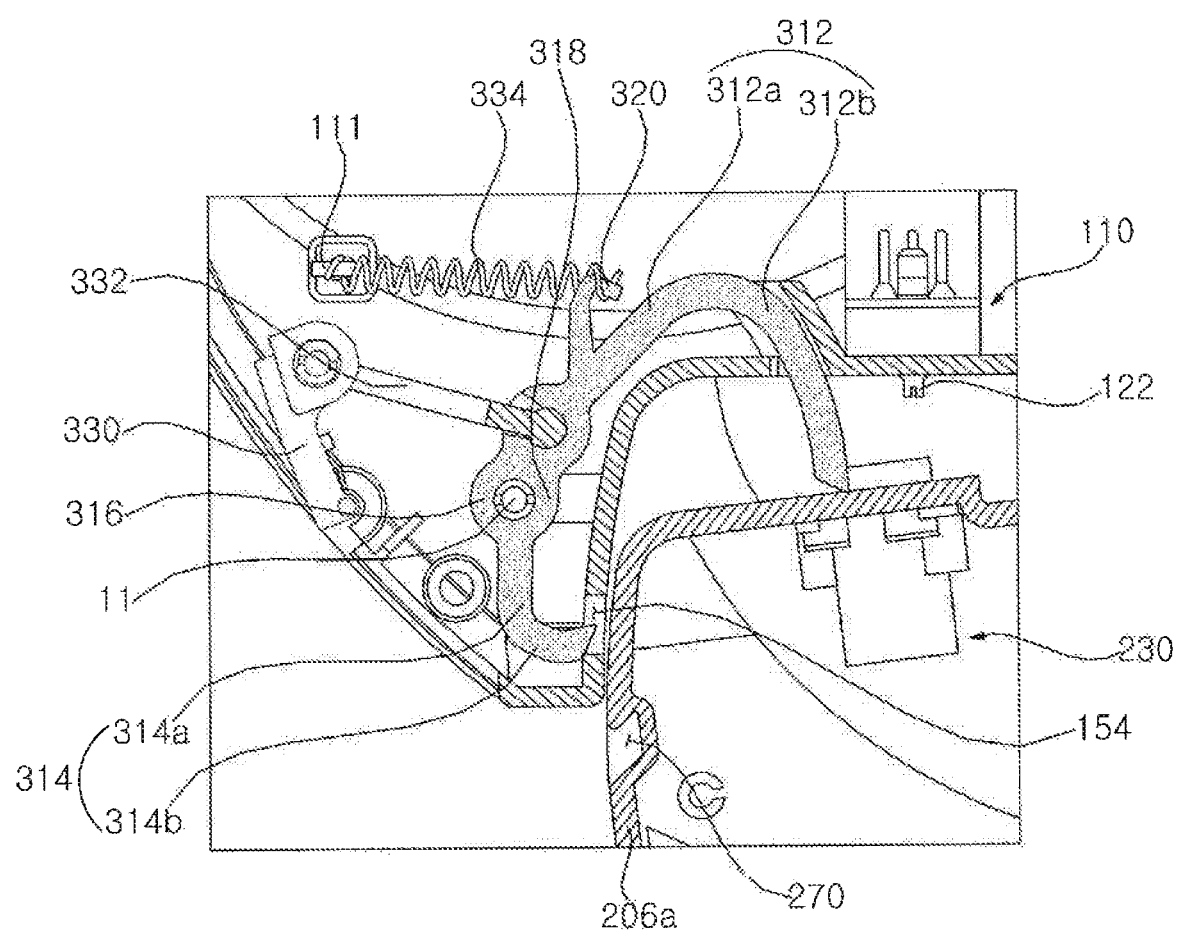
FIG. 11B is a diagram explaining a state in which a water tank is withdrawn to the outside of a water tank housing by a locking device, according to an embodiment of the present disclosure.
Figure 12:
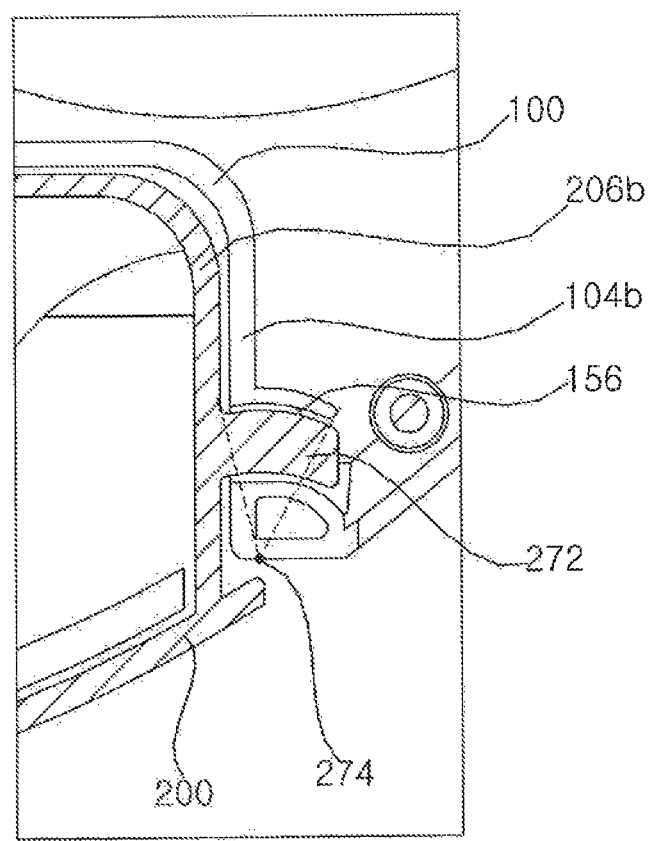
FIG. 12 is a diagram explaining a connective relationship between a hinge protrusion of a water tank and a hinge protrusion groove of a water tank housing, according to an embodiment of the present disclosure.

Referring to FIGS. 10-12, the water tank housing 100 may have a pressing lever hole 150 (FIG. 11A) through which a pressing lever 312 described below passes. The pressing lever hole 150 may be formed in the housing front surface 102. The water tank housing 100 may have a pressing lever guider or guide 152 protruding forward from one side of the pressing lever hole 150 and guiding the movement of the pressing lever 312. The pressing lever 312 may be inserted into the pressing lever guider 152 to move. At least a portion of the pressing lever 312 may be supported by the pressing lever guider 152, thereby reducing a likelihood that the pressing lever 312 will be damaged when the water tank 200 is pushed rearwards.

The water tank housing 100 may have a hinge protrusion groove 156 (FIG. 12) into which the hinge protrusion 272 of the water tank 200 is inserted. The hinge protrusion groove 156 may be formed at the second housing side surface 104b. The hinge protrusion groove 156 may have a shape corresponding to the hinge protrusion 272. Accordingly, even when one side of the water tank 200 protrudes rearwards by the pressing lever 312, the hinge protrusion 272 and the hinge protrusion groove 156 may not interfere with the movement of the water tank 200.

A structure of the locking device 300 will be described below with reference to FIGS. 10, 11A and 11B.

A robot cleaner 1 according to an embodiment of the present disclosure includes a locking device 300. When the water tank 200 is mounted in the water tank housing 100, the locking device 300 may fix the water tank 200 to the water tank housing 100 or release the water tank 200 from the water tank housing 100. The locking device 300 may be rotatably mounted on the inside of the main body 10 such that, depending on the arrangement, the locking device 300 may fix the arrangement of the water tank 200, or may move the water tank 200 to the rear side.

The locking device 300 may rotate about a rotary shaft formed on an outer side of the first housing side surface 104a. The locking device 300 may include a lever 310 and a button 330, The lever 310 may be inserted into the lever groove 270 of the water tank 200 or press the case front surface 204 of the water tank 200. The button 330 may be provided on the circumferential surface of the main body 10 and connected to the lever 310. Here, the connection of the button 330 and the lever 310 may be implemented as a direct connection of the button 330 and the lever 310 or alternatively an indirect connection via another member. The locking device 300 may include a press bar 332 to transmit a force exerted on the button 330 to the lever 310. The button 330 may transmits an external force to the lever 310 to rotate the lever 310.

The locking device 300 may include an elastic member or spring 334 to maintain a basic or initial arrangement of the lever 310. Here, the basic arrangement of the lever 310 refers to a state in which pressure is not transmitted from the button 330 to the lever 310. In the basic arrangement of the locking device 300, the locking lever 314 is provided to pass through the locking lever hole 154. In the basic arrangement of the locking device 300, the pressing lever 312 is provided to pass through the pressing lever hole 150 so as not to protrude rearward of the water tank housing 100.

The lever 310 may be provided rotatably about the rotary shaft formed on the inside of the main body 10. In addition to the pressing lever 312 and the locking lever 314, the lever 310 may include a rotation fixing part or fulcrum 316 rotatably coupled to the main body 10, and a press bar connecting part or joint 318 coupled to the press bar 332. The pressing lever 312 may protrude forward from the rotation fixing part 316 and be bent toward the housing front surface 102. The locking lever 314 may protrude rearward from the rotation fixing part 316 and be bent toward the first housing side surface 104a of the water tank housing 100. The pressing lever and the locking lever 312 and 314 may alternatively be referred to as first and second levers or arms.

The lever 310 may rotate about a rotary shaft spaced apart from an outer side of the circumferential surface of the water tank housing 100. When rotating in a first direction, the lever 310 may be inserted into the lever groove 270 formed at a side surface 206a of the water tank 200. When rotating in an opposite direction to the first direction, the lever 310 may press the front surface of the water tank 200.

The rotation fixing part 316 may have a shaft protrusion 11 protruding from the main body 10 and an insertion hole into which the shaft protrusion 11 is inserted. The rotation fixing part 316 may be provided behind the housing front surface 102. The rotation fixing part 316 may be spaced apart from the first housing side surface 104a. The rotation fixing part 316 may be provided to be closer to the locking lever hole 154 than to the pressing lever hole 150.

The press bar connecting part 318 may be provided at the front of the rotation fixing part 316 at the pressing lever 312. The press bar connecting part 318 may be provided to be closer to the rotation fixing part 316 than to an end portion 3121 of the pressing lever 312. Accordingly, even when the press bar 332 moves over a small range, the end portion 3121 of the pressing lever 213 may move over a large range.

The pressing lever 312 may include a forward extending lever 312a extending forward from the rotation fixing part 316 and a bent pressing lever 312b being bent from an end portion of the forward extending lever 312a and forming a curved surface.

When the button 330 is pressed, the pressing lever 312 passes through the pressing lever hole 150 of the water tank housing 100 to press the case front surface 204 of the water tank 200. When the pressing lever 312 passes through the pressing lever hole 150 to protrude to the mounting space 100s, the water tank 200 may be withdrawn rearward and released.

The locking lever 314 may include a rearward extending lever 314a extending rearward from the rotation fixing part 316 and a bent locking lever 314b bent from an end portion of the rearward extending lever 314a and forming a curved surface.

An extended length of the locking lever 314 extending from the rotation fixing part 316 to an end of the bent locking lever 314b may be shorter than an extended length of the pressing lever 312 extending from the rotation fixing part 316 to the end portion 3121 of the of the bent pressing lever 312b. A radius of curvature of the curved surface formed by the bent locking lever 314b may be smaller than a radius of curvature of the curved surface formed by the bent pressing lever 312b. The bent locking lever 314b may be more curved or rounded than the bent pressing lever 312b.

In the basic arrangement of the locking device 300, the locking lever 314 may pass through the locking lever hole 154 formed at the water tank housing 100 to be inserted into the lever groove 270 of the water tank 200 to fix or lock the arrangement of the water tank 200 mounted in the water tank housing 100.

The pressing lever 312 and the locking lever 314 may be integrally formed with each other, or alternatively, may be formed separately and later combined. The pressing lever 312 may be bent toward the housing front surface 102, and the locking lever 314 may be bent toward the second housing side surface 104b.

The pressing lever 312 and the locking lever 314 may not come into contact with the water tank 200 at the same time so as to avoid damaging the pressing lever 312. When the pressing lever 312 is pressed at the same time the locking lever 314 is inserted into the lever groove 270, the pressing lever 312 may be damaged. Accordingly, after the pressing lever 314 is withdrawn from the lever groove 270, the pressing lever 312 may press the water tank 200, or after the pressing lever 312 is in a position not to press the water tank 200, the locking lever 314 may be inserted into the lever groove 270.

The lever 310 may include a hooking lever or hook 320 protruding from one side of the pressing lever 312 and connected to the elastic member 334. The hooking lever 320 extends from one side of the pressing lever 312 in a direction where the button 330 is provided. The elastic member 334, being connected to the hooking lever 320, may apply an elastic force to the pressing lever 312 in the direction where the button 330 is provided. The locking lever 314, being integrally formed with the pressing lever 312, may also rotate to be inserted into the lever groove 270, but by using the elastic member 334, less force is required to push the pressing lever 312 when the water tank 200 is mounted, thereby preventing damage of the pressing lever 312.

The button 330 is provided on a circumferential surface of the main body 10. A rear end of the button 330 is rotatably fixed to one side of the main body 10. Accordingly, when a user presses the button 330, a front end 330a of the button 330 may move to the inside of the main body 10 while rotating.

The front end or inner portion 330a of the button 330 may be rotatably connected to the press bar 332. The press bar 332 may be connected to the lever 310 and the button 330 in a link structure. Accordingly, one end of the press bar 332 may be rotatably connected to the button 330, and the other end thereof may be rotatably connected to the lever 310.

When a user presses the button 330, the press bar 332 presses the lever 310. When the user presses the button 330, one side of the pressing lever 312 rotates about the rotation fixing part 316, such that an end portion of the pressing lever 312 passes through the pressing lever hole 150 of the water tank housing 100, to protrude to the mounting space 100s of the water tank housing 100. Accordingly, while the water tank 200 is mounted in the water tank housing 100, the pressing lever 312 presses rearward the case front surface 204 of the water tank 200, such that the water tank 200 is released and withdrawn rearward from the water tank housing 100.

When the user does not press the button 330, the elastic member 334 pulls the pressing lever 312 in a direction where the button 330 is provided, such that the locking lever 314 passes through the locking lever hole 154 to protrude to the mounting space 100s of the water tank housing 100. While the water tank 200 is mounted in the water tank housing 100, the locking lever 314 is inserted into the lever groove 270 of the water tank 200, such that the water tank 200 may be fixedly provided in the water tank housing 100.

The hinge protrusion 272 may protrude from the second case side surface 206b at a position facing the locking lever 314. The hinge protrusion 272 may protrude forward from the second case side surface 206b in a convex curved shape.

A center of curvature 274 of a curved surface of the hinge protrusion 272 may be provided at an end of the second side surface 104b of the main body 10, which may be adjacent to the case rear surface 212 or the second case side surface 206b when the water tank 200 is mounted. The water tank 200 may rotate about the center of curvature 274 to be mounted in the water tank housing 100.

The hinge protrusion groove 156 has a recess formed at the water tank housing side surface 104b, so that the hinge protrusion 272 may be inserted thereinto. The hinge protrusion groove 156 may have a curved surface so that the hinge protrusion 272 having a curved shape may be inserted thereinto. The hinge protrusion groove 156 may include a center of curvature at a same position as a center of curvature of the curved surface of the hinge protrusion 272.

Second Embodiment

Figure 13A:
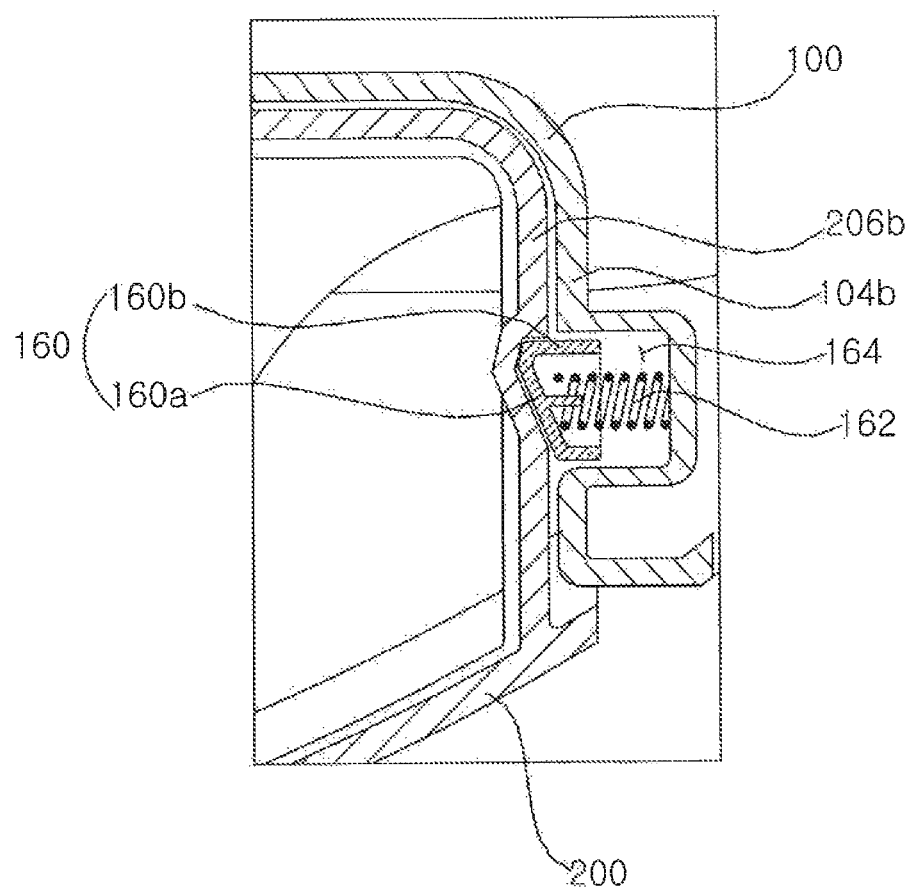
FIG. 13A is a diagram explaining a stopper of a water tank housing.
Figure 13B:
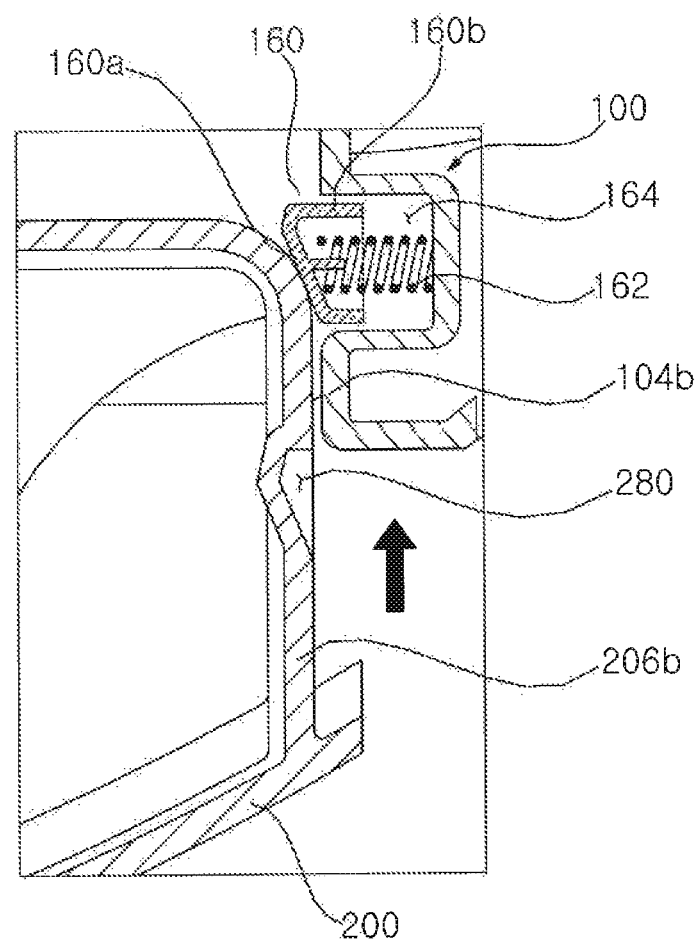
FIG. 13B is a diagram explaining a state in which a water tank is mounted in the water tank housing by a stopper groove of the water tank, according to a second embodiment of the present disclosure.
Figure 13C:
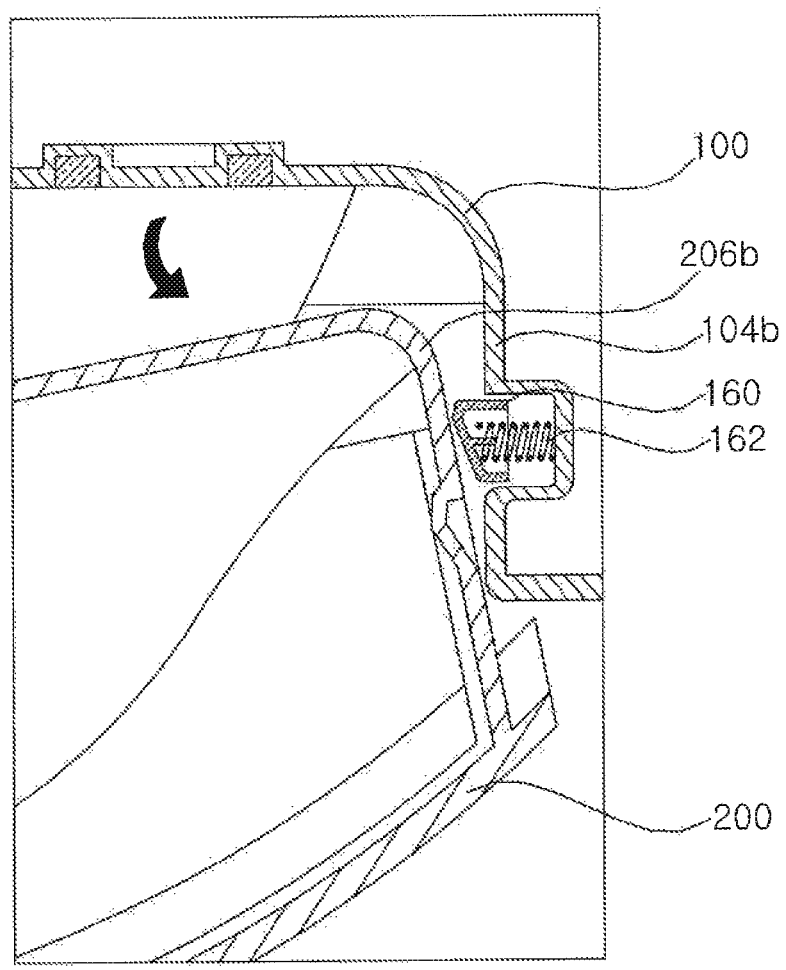
FIG. 13C is a diagram explaining a state in which the water tank is detached from the water tank housing in the structure of FIG. 13A.
Figure 14:
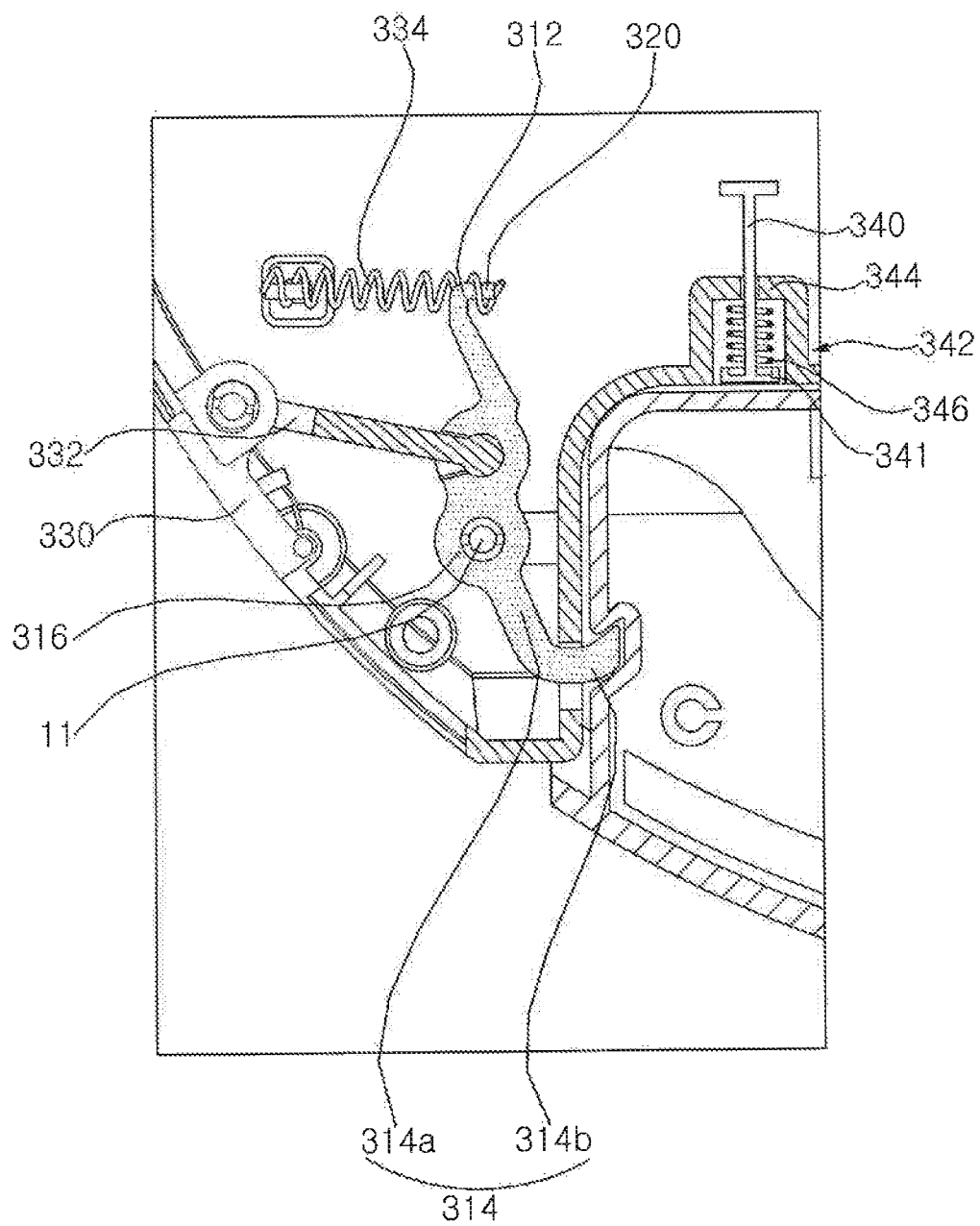
FIG. 14 is a cross-sectional view of a water tank mounted in a water tank housing having a release arm, taken in a left-right direction according to a third embodiment of the present disclosure.

A structure of the water tank housing 100 including the water tank 200 and a stopper 160 according to a second embodiment of the present disclosure will be described below with reference to FIGS. 13A and 13B. The configuration described in FIGS. 13A and 13B is a configuration arranged on the second case side surface 206b of the water tank 200 and the second housing side surface 104b of the water tank housing 100, and the locking device 300 described above with reference to FIGS. 10 to 11B may also be included.

That is, the hinge protrusion 272 and the hinge protrusion groove 156 described in FIGS. 9 and 12 may be replaced with the stopper 160 and a stopper groove 280 which will be described below with reference to FIGS. 13A and 13B.

The stopper 160 may be provided at the second housing side surface 104b of the water tank housing 100. The stopper 160 may protrude into the mounting space 100s by a stopper elastic member or spring 162. When an external pressure or force is applied, the stopper 160 may be inserted into a stopper guide groove 164 formed at the second housing side surface 104b, and the stopper elastic member 162 may be compressed.

The stopper 160 may include an inclined surface 160a formed to be directed toward the rear side when the stopper 160 protrudes to the mounting space 100s, and a hooking or side surface 160b bent from a front end of the inclined surface 160a and extending toward the stopper guide groove 164. When no external force is applied, the inclined surface 160a and the hooking surface 160b of the stopper 160 may protrude to the mounting space 100s. Accordingly, when the water tank 200 is inserted into the mounting space 100s, the water tank 200 comes into contact with the inclined surface 160a, such that the stopper 160 may move to the stopper guide groove 164. However, once the water tank 200 is mounted in the water tank housing 100, the stopper 160 may be inserted into a stopper groove 280 formed in the second case side surface 206b via an elastic restoring force of the stopper elastic member 162, and the hooking surface 160b may prevent the water tank 200 from being withdrawn from the water tank housing 100.

The water tank 200 may include the stopper groove 280 into which the stopper 160 is inserted when the water tank 200 is mounted. The stopper groove 280 may have a shape corresponding to the inclined surface 160a and the hooking surface 160b of the stopper 160 and be configured to surround or contact at least a portion of the hooking surface 160b such that a rearward direction of the water tank 200 may be prevented.

The stopper 160 may be adjacent to the rear end of the second housing side surface 206b, and a connection portion between the inclined surface 160a and the hooking surface 160b may be formed in a curved shape such that, when one side of the water tank 200 is pushed rearward by the locking device 300 of FIGS. 10 to 11B, the water tank 200 may be withdrawn by rotating about the stopper 160 as an axis.

In the second embodiment, unlike the first embodiment, the water tank 200 may be mounted in a straight line or linearly instead of rotating or pivoting via the hinge protrusion 272. In other words, according to the second embodiment, the water tank 200 is mounted in a straight line toward the water tank housing 100 and may be withdrawn therefrom by rotating about the stopper 160 as an axis. Compared to the first embodiment, in which the water tank 100 is mounted while rotating, the second embodiment has an effect in that the water tank 100 may be mounted more easily.

Third Embodiment

Hereinafter, a structure of the water tank housing 100 having the water tank 200 and a release arm 340 according to a third embodiment of the present disclosure will be described with reference to FIGS. 14 and 15A to 15C. The third embodiment shows an arrangement of the first case side surface 206a of the water tank 200 and an arrangement of the first housing side surface 104a of the water tank housing 100, and details which do not conflict with those described above in FIGS. 1 to 13 may also be included herein.

The pressing lever 312 of FIGS. 8 to 12 may be partially replaced with a release arm 340 separately formed from the lever 310. The pressing lever 312 and the release arm 340 may be used together to reduce a reaction force exerted on the pressing lever 312, thereby preventing damage to the pressing lever 312.

The water tank housing 100 may include the release arm 340, which presses the mounted water tank 200 to release the water tank 200. The release arm 340 may move rearward toward the water tank 200 to release the water tank 200.

The release arm 340 may be biased toward the left side of the water tank housing front surface 102 to be closer to the locking device 300. At least a portion of the side surface (e.g., second side surface 206b) of the water tank 200 may be withdrawn by rotating about the hinge protrusion 272 or the stopper 160 described above.

The release arm 340 may include a head 341 formed at a rear end thereof adjacent to the water tank 200. The head may increase an area of the water tank 200 pressed by the release arm 340, and may support one side of a release arm elastic member or spring 346.

A release arm guide hole or recess 342 may be recessed forward from the water tank housing front surface 102 to form a space in which the release arm 340 is provided. A release arm support surface 344 formed by being recessed forward from the water tank housing 100 may support the other side of the release arm elastic member 346. The release arm 340 may be provided to pass through the release arm support surface 344, and the release arm support surface 344 may form a boundary of a front head opposite to the head 34,1 which is pushed forward when the water tank 200 is mounted and rearward when the water tank 200 is released.

The head 341 may similarly be pushed rearward to push the water tank 200 to release the water tank 200, or forward into the release arm guide hole 342 when the water tank 200 is mounted.

The release arm elastic member 346 may be included in the release arm guide hole 342. A front surface of the release arm elastic member 346 may be supported by the release arm support 344, and a rear surface thereof comes into contact with a rear surface of the head 341 to press the head 341 rearward. The release arm elastic member 346 may press the water tank 200 with the release arm 340, such that when the locking lever 314 is disengaged from the lever groove 270, a restoring force of the release arm elastic member 346 pushes the water tank 200 rearward.

The locking device 300 includes the elastic member 334 for maintaining a basic arrangement of the lever 310. The hooking lever 320 may protrude forward from one side of the rotation fixing part 316, and the elastic member 334 may be connected to the hooking lever 320. When the locking device 300 is in a basic arrangement, the locking lever 314 is provided to pass through the locking lever hole 154. Unlike the first embodiment, the third embodiment does not include an elongated portion of the pressing lever 312 such that when the water tank 200 is mounted, the locking device 300 may not return to the position of the basic arrangement. Accordingly, the third embodiment includes the elastic member 334 to return the locking device 300 to the position of the basic arrangement.

A modification or deformation of the insertion part sealer 130 according to the third embodiment will be described below with reference to FIGS. 15A to 15C.

The insertion part sealer 130 may be made of a flexible material and may be modified or deformed easily. The contact protrusions 136a and 136b of the insertion part sealer 130 may form an inclined surface in a hopper shape in a front and radial direction of the connection nozzle 120.

Figure 15A:
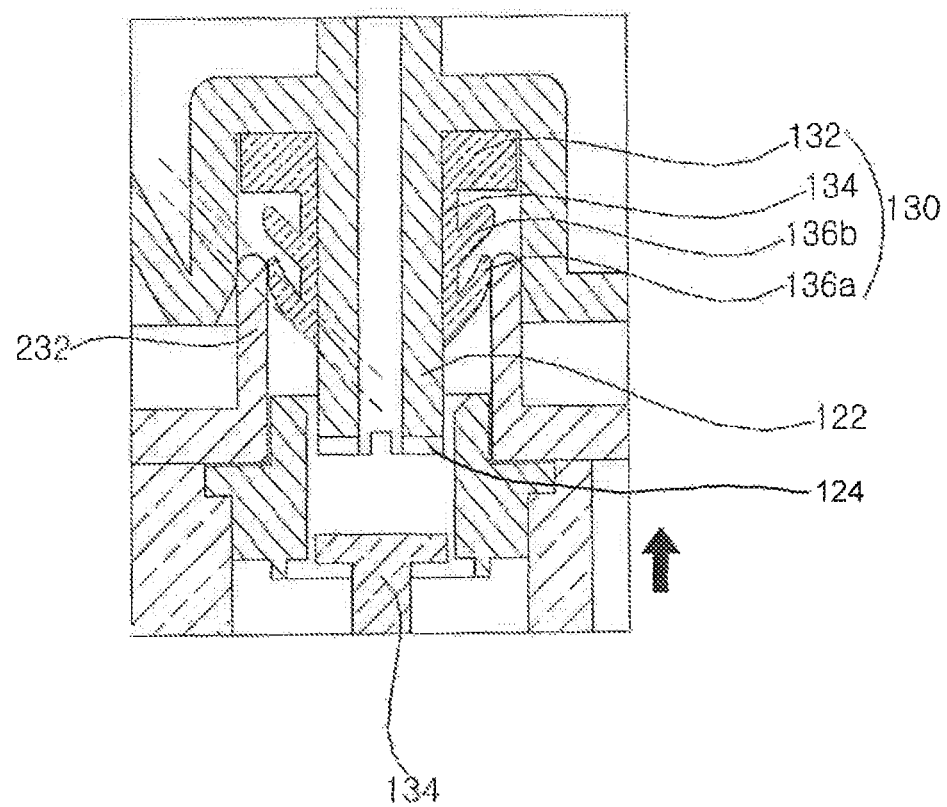
FIG. 15A is a cross-sectional view of a modified insertion part sealer, which is modified when a discharge nozzle is inserted into a supply nozzle, according to the third embodiment of the present disclosure.

Referring to FIG. 15A, the insertion nozzle 232 may be inserted into the insertion part 112, and the second contact protrusion 136b is in a basic state, forming a straight inclined surface. The first contact protrusion 136a is in a state, in which the insertion nozzle 232 is inserted, and is modified to have a curved surface while being pushed into the front side.

Figure 15B:
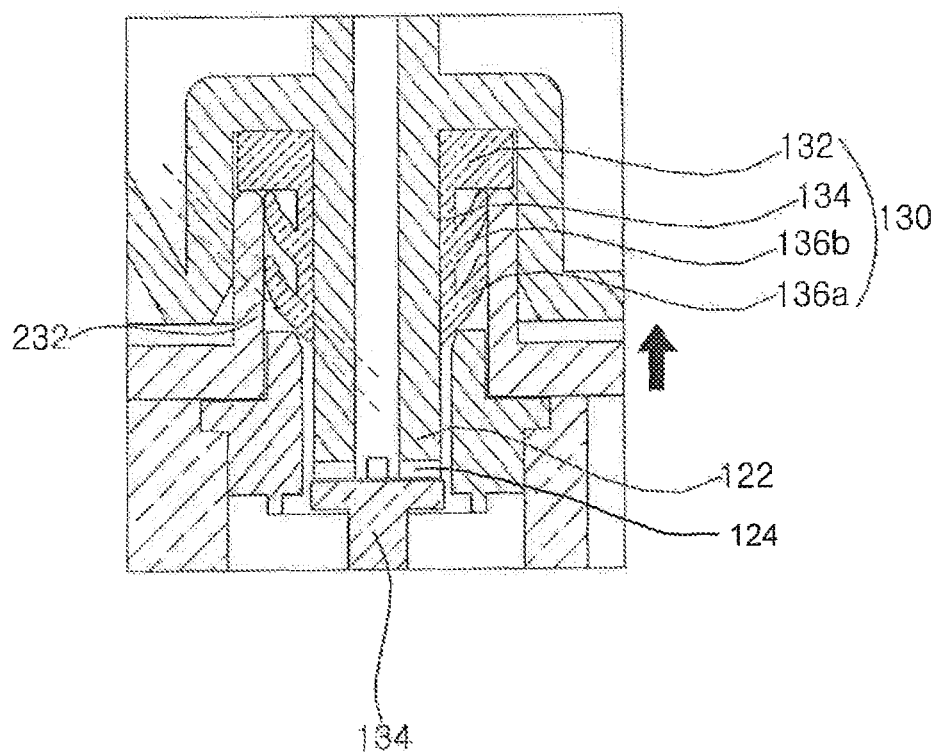
FIG. 15B is a cross-sectional view of a modified insertion part sealer, which is modified when the discharge nozzle is inserted into the supply nozzle up to a limit position in FIG. 15A.

Referring to FIG. 15B, the insertion nozzle 232 is inserted up to a limit position, in which the first and second contact protrusions 136a and 136b are modified or deformed to have a curved surface while being pushed into the front side. A slope of a lower end, formed by the first and second contact protrusions 136a and 136b of FIG. 15B, may be shallower in a radial direction that a slope of the straight inclined surface formed by the second contact protrusion 136b of FIG. 15A.

Figure 15C:
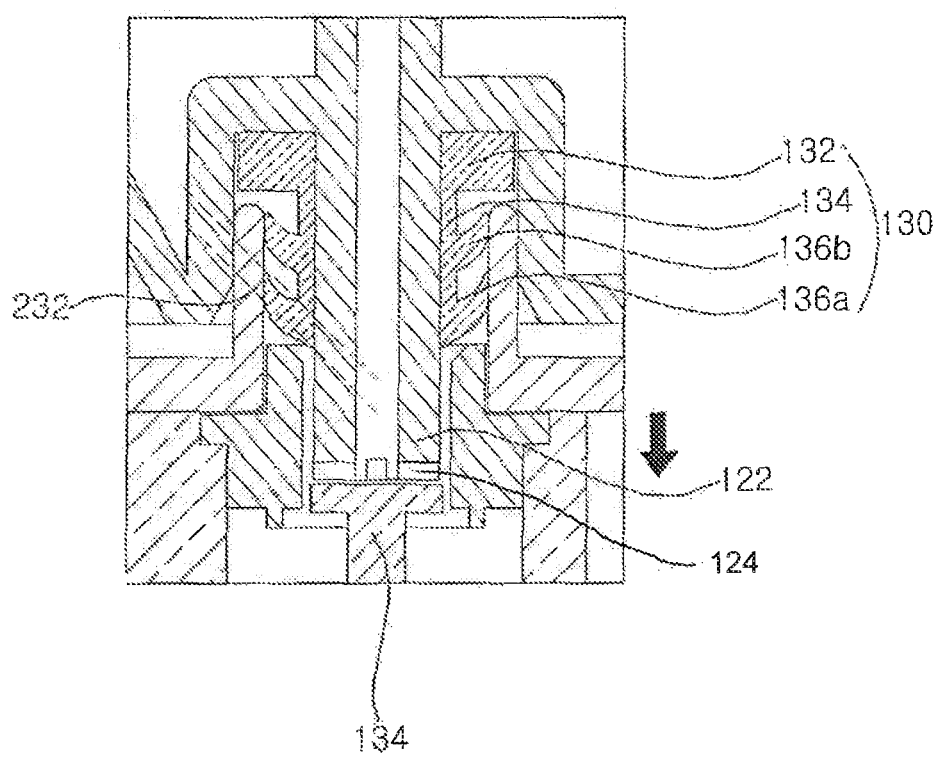
FIG. 15C is a cross-sectional view of a modified insertion part sealer, which is modified when the discharge nozzle is partially withdrawn from the supply nozzle in FIG. 15B.

Referring to FIG. 15C, according to the third embodiment, the release arm 340 and the release arm elastic member 346 press the water tank 200 such that the insertion nozzle 232 may be slightly withdrawn rearward again. In this case, the first and second contact protrusions 136a and 136b are pushed backward by the movement of the insertion nozzle. A slope of the lower end, formed by the first and second contact protrusions 136a and 136b, may be steeper in a radial direction that a slope of the straight inclined surface or upper tip formed by the unmodified second contact protrusion 136b of FIG. 15A. The first and second contact protrusions 136a and 136b may be deformed to a curved "L" shape or a shape similar to an "L" to press an inner circumferential surface of the insertion nozzle 232 more strongly or tightly in a radial direction.

In the third embodiment, when the water tank 200 is mounted, the insertion nozzle 232 is slightly withdrawn by the release arm 340, and the first and second contact protrusions 136a and 136b are modified to have a high slope angle by moving backward, and the modified first and second contact protrusions 136a and 136b may press the inner circumferential surface of the insertion nozzle 232 more strongly, thereby further preventing leakage.

This application is related to co-pending U.S. application Serial No. 16/944,375 filed on Jul. 31, 2020 and Ser. No. 16/943,288 filed on Jul. 30, 2020, the entire contents of which are hereby incorporated by reference.

According to the present disclosure, the robot cleaner has one or more of the following effects.

Firstly, a locking lever may fix the water tank when the water tank is mounted and be integrally formed with a pressing lever pushing the water tank backward when the water tank is detached such that the pressing lever pushes the water tank backward at the same time when the locking lever releases the fixing, thereby allowing a user to easily withdraw the water tank by a one-time press of a button.

Secondly, by providing a hinge protrusion provided at an opposite side surface to the locking device and having a curved surface, the water tank may be mounted and detached by rotating, such that the water tank may be fixed stably.

Thirdly, by providing a stopper provided at a side surface opposite to the locking device and having a stopper protrusion and an elastic member, the water tank may be mounted or slid in a straight line and is detached by rotating, such that the water tank may be mounted easily and fixed stably.

Fourthly, by providing a release arm having an elastic member and serving to press a front portion of the water tank and push the water tank backward at the same time when the locking lever releases the fixing, a user may easily withdraw the water tank by a one-time press of a button.

Embodiments disclosed herein may provide a robot cleaner which allows a user to easily withdraw a water tank mounted in the robot cleaner.

Embodiments disclosed herein provide a robot cleaner having a detachable water tank in which the mounted water tank is stably fixed thereto.

Embodiments disclosed herein are not limited to the aforementioned objects and other objects not described herein will be clearly understood by those skilled in the art from the following description.

Embodiments disclosed herein may be implemented as a robot cleaner including a water tank forming a space for storing water and a main body forming an exterior and having a water tank housing formed at a rear side thereof. The water tank housing may form a space in which the water tank is mounted. The robot cleaner may further include a pair of spin mops provided at a lower side of the main body and configured to move the main body by rotating and to mop a surface to be cleaned, a supply nozzle provided at one side of the water tank housing configured to supply water stored in the water tank to each of the pair of spin mops when the water tank is mounted, a discharge nozzle provided at one side of the water tank and connected to the supply nozzle when the water tank is mounted to communicate the water tank with the supply nozzle, and a locking device rotatably provided at a position spaced apart from a circumferential surface of the water tank housing, fixing an arrangement of the water tank mounted in the water tank housing, and pushing backward against the water tank mounted in the water tank housing.

The locking device may include a lever and a button. The lever may rotate about a rotary shaft provided at a position spaced apart from an outer side of the circumferential surface of the water tank housing and be inserted into a lever groove formed at a side surface of the water tank or press a front surface of the water tank. The button may be formed on the circumferential surface of the main body and connected to the lever. When a user applies a force to the button, the lever may press the front surface of the water tank to allow the water tank to be withdraw.

The locking device may further include a press bar transmitting a force exerted on the button to the lever and an elastic member maintaining a basic arrangement of the lever such that the force exerted on the button may be transmitted to the press bar. When no external force is applied, a basic arrangement may be maintained by the elastic member.

The lever may include a rotation fixing part rotatably connected to the main body, press bar connecting part connected to the press bar, a locking lever, and a pressing lever. The pressing lever may protrude forward from the rotation fixing part and be bent toward a front surface of the water tank housing. The pressing lever may press a front surface of the water tank mounted in the water tank housing. The locking lever may protrude rearward from the rotation fixing part and be bent toward a locking lever hole formed at a side surface of the water tank housing.

In the basic arrangement of the locking device, the locking lever may be inserted into a locking lever hole formed at a side surface of the water tank housing and may be inserted into a lever groove of the water tank when the water tank is mounted in the water tank housing. When pressure is applied to the button, the locking lever may be disengaged from the lever groove, and the pressing lever may press the water tank to a rear side of the water tank housing. In this arrangement, a user may easily withdraw the water tank, and while the water tank is mounted in the water tank housing, the water tank may be stably fixed thereto.

The water tank may include a hinge protrusion protruding forward in a convex curved shape from a side surface opposite to one side surface of the water tank at which the lever groove is formed. A hinge protrusion groove into the hinge protrusion of the water tank is inserted may be formed at the water tank housing such that the hinge protrusion may secure the water tank or may function as a hinge axis when the water tank is withdrawn by the locking device.

The water tank housing may have a stopper provided at a side surface opposite to one side surface of the water tank housing at which the locking device is formed. The stopper may protrude to the mounting space by a stopper elastic member. The water tank may have a stopper groove into which the stopper is inserted when the water tank is mounted in the water tank housing so as to fix the arrangement of the water tank, thereby fixing the other side of the water tank.

The supply nozzle may include an insertion part provided at one side of the water tank housing and forming an insertion space in which the discharge nozzle is inserted and a pressing nozzle protruding from the insertion part in a direction in which the water tank is provided. When the water tank is mounted in the water tank housing, the pressing nozzle may press a discharge port valve to open a discharge port. The supply nozzle may further include an insertion part sealer or gasket provided at the insertion space and being pressed against the insertion nozzle inserted into an insertion groove.

The insertion part sealer may include an end contact surface provided at an inner end portion of the insertion part and coming into contact with an end portion of the discharge nozzle inserted into the insertion space, a pressing nozzle contact surface connected to the end contact surface and extending along a circumferential surface of the pressing nozzle, and at least one contact protrusion protruding from the pressing nozzle contact surface toward the insertion space. The contact protrusion may include a first contact protrusion provided at an end portion of the pressing nozzle contact surface and a second contact protrusion interposed between the first contact protrusion and the end contact surface, thereby preventing water from leaking to the outside.

Embodiments disclosed herein may be implemented as a water tank forming a space for storing water, a main body having a water tank housing formed at a rear side thereof, the water tank housing forming a space in which the water tank is mounted, a pair of spin mops provided at the main body and configured to perform cleaning using the water, and a locking device rotatably provided on an inside of the main body and, by rotating, selectively fixing the water tank or moving the water tank backward.

Details of other embodiments are included in the detailed description and the accompanying drawings. However, the effects of the present disclosure are not limited to the aforesaid, and other effects not described herein will be clearly understood by those skilled in the art from the following description of the appended claims.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure. The embodiments are provided only to complete disclosure of the present disclosure and to fully provide a person having ordinary skill in the art to which the present disclosure pertains with the category of the present disclosure, and the present disclosure will be defined by the scope of the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A robot cleaner, comprising:
a tank configured to store liquid;
a main body having a recess formed at a side, the recess configured to receive the tank;
at least one spin mop provided at the main body;
a supply nozzle provided at a side of the recess;

a discharge nozzle provided at a side of the tank and configured to align with the supply nozzle when the tank is provided in the recess such that liquid stored in the tank flows through the supply nozzle and the discharge nozzle to the spin mop; and a lock rotatably provided inside of the main body and having a first end and a second end, wherein the first end is configured to partially protrude into the recess to lock a position of the tank in the recess, and the second end is configured to partially protrude into the recess to unlock the tank from the recess, wherein the tank includes a lever groove formed at a side surface, and wherein the lock comprises:

a lever rotating about a rotary shaft provided inside of the main body and having the first end and the second end, the first end being configured to be inserted into the lever groove formed when the lever is rotated in a first direction, and the second end being configured to press a front surface of the tank when rotating in a second direction opposite direction to the first direction; and a button provided at the outer surface of the main body and connected to the lever to transmit an external force to the lever.

2. The robot cleaner of claim 1, wherein the lock further comprises a press bar having a first end connected to the button and a second end connected to the lever to transmit the force exerted on the button to the lever.

3. The robot cleaner of claim 2, wherein the lever comprises a fulcrum rotatably connected to the main body, and wherein the lever is connected to the press bar at a position spaced apart from the fulcrum.

4. The robot cleaner of claim 1, wherein the lever includes a first lever having the first end, and a side surface of the recess is formed with a first opening configured to align with the lever groove, the first lever being configured to protrude out of the first opening and to be inserted into the lever groove when the tank is mounted in the recess.

5. The robot cleaner of claim 4, wherein the lever further includes a second lever having the second end, and a front surface of the recess is formed with a second opening, and when the button is pressed, the first lever is disengaged from the lever groove, and the second lever protrudes out of the second opening to push the tank rearward away from the recess.

6. The robot cleaner of claim 5, wherein the first and second levers are coupled at a fulcrum, the second lever is curved from the fulcrum toward the front surface of the recess, and the first lever is curved from the fulcrum toward the side surface of the recess.

7. The robot cleaner of claim 5, wherein lengths of the first and second levers are configured such that only one of the first and second levers contact the tank at a time.

8. The robot cleaner of claim 5, further comprising a guide surface protruding from an edge of the second opening into the main body, the guide surface having a curvature configured to guide a movement of the second lever.

9. The robot cleaner of claim 5, further comprising:

a third lever protruding from the second lever at a position inside of the main body; and an elastic member coupled to the main body and coupled to an end of the third lever such that, when the button is pressed, the elastic member is expanded and the second lever protrudes out of the second opening, and a restoring force of the elastic member withdraws the second lever through the second opening back into the main body.

10. The robot cleaner of claim 1, wherein the supply nozzle comprises:

an insertion protrusion protruding into the recess and having an inner space in which the discharge nozzle is inserted;

a pressing nozzle protruding further into the recess from the insertion protrusion and configured to contact a discharge port of the discharge nozzle when the tank is mounted to open the discharge port; and a seal provided in the inner space of the insertion protrusion, surrounding the pressing nozzle, and configured to contact the discharge nozzle.

11. The robot cleaner of claim 10, wherein the seal comprises:

an end contact surface provided at an inner end of the insertion protrusion and coming into contact with an end portion of the discharge nozzle when inserted into the inner space;

a pressing nozzle contact surface connected to the end contact surface and extending along a circumferential surface of the pressing nozzle; and at least one contact fin protruding from the pressing nozzle contact surface outward in the insertion space toward the discharge nozzle.

12. The robot cleaner of claim 1, wherein the tank comprises a groove formed at a first side surface and a hinge protrusion protruding at a second side surface opposite the first side surface, the groove being configured to receive the first end of the lock to maintain a position of the tank in the recess, and the hinge protrusion being configured to couple to a hinge protrusion groove formed in the recess.

13. The robot cleaner of claim 12, wherein a center of curvature of a curved surface of the hinge protrusion is provided at an end of the second side surface, and the tank rotates about the center of curvature to be mounted in the recess.

14. The robot cleaner of claim 1, wherein the first end of the lock protrudes out of a first side surface of the recess, and a second side surface of the recess opposite to the first side surface includes a stopper coupled to an elastic member and protruding into the recess, wherein the tank has a stopper guide groove configured to receive the stopper when the tank is mounted in the recess so as to maintain a position of the tank.

15. The robot cleaner of claim 14, wherein the stopper comprises:

an inclined surface inclined inward from a rear side to a front side; and a bent surface bent from a front end of the inclined surface to extend in a left-right direction perpendicular to a front-rear direction in which the tank is slid into the recess, wherein a shape of the stopper guide groove corresponds to a shape of the stopper such that the bent surface restricts rearward movement of the tank.

16. A robot cleaner, comprising:

a main body having a recess formed at a rear;

a tank configured to be inserted into and withdrawn from the recess, the tank being configured to store liquid;

a spin mop coupled to a bottom of the main body and configured to receive the liquid; and a lock provided inside of the main body and configured to pivot in a first direction to lock a position of the tank in the recess and to pivot in a second direction opposite to the first direction to release the tank from the recess, wherein the tank includes a groove, and the lock comprises:
a lever configured to pivot around a rotary shaft provided inside of the main body, the lever having a first end and a second end, wherein, when the tank is mounted in the recess, the first end is inserted into the groove to maintain a position of the tank; and
a button having a surface exposed to an outside of the main body and connected to the lever such that, when the tank is mounted and the button is pressed, the lever is rotated such that the second end pushes the tank away from the recess to decouple the groove from the first end.

* * * * *